(12) United States Patent
Charfauros

(10) Patent No.: US 11,977,453 B2
(45) Date of Patent: *May 7, 2024

(54) VIRTUAL REPLICATION OF UNSTRUCTURED DATA

(71) Applicant: restorVault, LLC, San Diego, CA (US)

(72) Inventor: Jesse Paul Charfauros, San Diego, CA (US)

(73) Assignee: restorVault, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,344

(22) Filed: Mar. 20, 2023

(65) Prior Publication Data

US 2023/0229564 A1 Jul. 20, 2023

Related U.S. Application Data

(63) Continuation of application No. 17/017,143, filed on Sep. 10, 2020, now Pat. No. 11,630,737.

(Continued)

(51) Int. Cl.
*G06F 16/00* (2019.01)
*G06F 11/14* (2006.01)
*G06F 16/188* (2019.01)

(52) U.S. Cl.
CPC ...... *G06F 11/1451* (2013.01); *G06F 11/1464* (2013.01); *G06F 11/1469* (2013.01); *G06F 16/188* (2019.01); *G06F 16/196* (2019.01)

(58) Field of Classification Search
CPC ............ G06F 11/1451; G06F 11/1464; G06F 11/1469; G06F 16/188; G06F 16/196; G06F 11/2094; G06F 11/2097
See application file for complete search history.

(56) References Cited

U.S. PATENT DOCUMENTS 7,290,017 B1 10/2007 Wang et al.
7,660,793 B2 * 2/2010 Indeck ................ G06F 16/2228
707/999.005

(Continued)

OTHER PUBLICATIONS

International Searching Authority/US, International Search Report and Written Opinion of the International Searching Authority, Application No. PCT/US2020/050446, dated Dec. 17, 2020, 8 pages.

(Continued)

*Primary Examiner* — Syed H Hasan
(74) *Attorney, Agent, or Firm* — Sunstein LLP

(57) ABSTRACT

A data management system includes: a transceiver; a memory; and a processor communicatively coupled to the transceiver and the memory and configured to: receive, via the transceiver, a copy data request for unstructured data; access, via the transceiver in response to the copy data request, a plurality of backed-up files of unstructured data stored in a first data storage device; send, in response to the copy data request, a plurality of Virtual Data Files (VDFs) to a second data storage device, the processor being configured to respond to receipt of information from each of the plurality of VDFs to retrieve a respective backed-up file of unstructured data of the plurality of backed-up files of unstructured data stored in the first data storage device.

20 Claims, 14 Drawing Sheets

Related U.S. Application Data

(60) Provisional application No. 62/899,214, filed on Sep. 12, 2019.

(56) References Cited

U.S. PATENT DOCUMENTS

| | | |
|---|---|---|
| 2001/0008019 A1 | 7/2001 | Vert et al. |
| 2005/0086231 A1 | 4/2005 | Moore |
| 2007/0244938 A1 | 10/2007 | Michael et al. |
| 2009/0222496 A1 | 9/2009 | Liu et al. |
| 2011/0145196 A1 | 6/2011 | Bender et al. |
| 2012/0023223 A1* | 1/2012 | Branch .............. G06F 9/4856 709/224 |
| 2012/0072685 A1 | 3/2012 | Otani |
| 2012/0311280 A1 | 12/2012 | Schmidt et al. |
| 2014/0006354 A1 | 1/2014 | Parkison et al. |
| 2014/0012896 A1 | 1/2014 | Chaplin et al. |
| 2014/0201162 A1 | 7/2014 | Kumarasamy et al. |
| 2015/0227438 A1 | 8/2015 | Jaquette et al. |
| 2016/0048408 A1* | 2/2016 | Madhu ................. H04L 47/783 718/1 |
| 2016/0110262 A1 | 4/2016 | Nanivadekar et al. |
| 2017/0339225 A1* | 11/2017 | Vasetsky .............. G06F 9/45558 |
| 2018/0239677 A1 | 8/2018 | Chen et al. |
| 2018/0329993 A1 | 11/2018 | Bedadala et al. |
| 2019/0034295 A1 | 1/2019 | Bourgeois et al. |
| 2019/0034507 A1* | 1/2019 | Duttagupta ......... G06F 16/1752 |
| 2019/0073276 A1 | 3/2019 | Yuen et al. |
| 2019/0095285 A1 | 3/2019 | McCormack |
| 2019/0179714 A1 | 6/2019 | Karthikeyan et al. |

OTHER PUBLICATIONS

United States Patent and Trademark Office, Non-final Office Action, U.S. Appl. No. 17/017,106, dated Jul. 21, 2022, 23 pages.
United States Patent and Trademark Office, Final Office Action, U.S. Appl. No. 17/017,106, dated Feb. 1, 2023, 32 pages.

* cited by examiner

VIRTUAL REPLICATION OF UNSTRUCTURED DATA

CROSS-REFERENCE TO RELATED APPLICATION

This application is a continuation of U.S. application Ser. No. 17/017,143, filed Sep. 10, 2020, entitled "VIRTUAL REPLICATION OF UNSTRUCTURED DATA," which claims the benefit of U.S. Provisional Application No. 62/899,214, filed Sep. 12, 2019, entitled "VIRTUAL CLOUD STORAGE FOR UNSTRUCTURED DATA," assigned to the assignee hereof, and the entire contents of which are hereby incorporated herein by reference.

BACKGROUND

Many companies today use on-premises and cloud based Server Storage and backup solutions to store and protect their data, including high-value data. The data typically includes both structured data (data stored as clearly-defined data types in a pattern that makes the data easily searchable, e.g., databases and database files) and unstructured data (data that are less-easily searchable, e.g., text files, images, videos, PDF (portable document format) files, etc.). Structured data may be stored in fields or records to facilitate searching whereas unstructured data may have internal structure but are not structured by pre-defined data models or schema. In a typical enterprise, International Data Corporation (IDC) estimates that unstructured data makes up over 80% of a company's data. IDC also estimates that of an enterprise's unstructured data, over 80% of the data is inactive, e.g., having not been accessed in over a year. Unfortunately, the same high-cost storage and backup solutions that enterprises use to store and protect their active data is used to store and protect the 80% of inactive unstructured data. To make matters worse, in the case of a disaster or a ransomware attack, where access to all data must be restored, recovery downtimes are extended due to the time needed to restore the inactive data, delaying access to active data. For cloud-based backup solutions, the cost for retrieving data includes the opportunity cost of lost time, e.g., fees for services that are not earned while a business is waiting for data to be restored. For example, if an entity has 1 terabyte (TByte) of data to be restored, and the company has a download speed of 50 Mbps, then restoring the entire 1 TByte of data will take 44.4 hours, or nearly two days, to restore the data. The opportunity cost may be lost revenue, and incurred expenses, for up to two days in this example. This cost may be further compounded by damage to customer relationships due to lack of availability of the company's services while the company is waiting for data to be restored.

Referring to FIG. 1, a data storage and retrieval system 510 includes a primary data center 512, a secondary data center 514, and the Internet 515. The primary data center 512, the secondary data center 514, and the Internet 515 are configured such that the Internet 515 can communicate bi-directionally with each of the primary data center 512 and the secondary data center 514. The primary data center 512 may be, for example, a business, or part of a business, that uses digital data and backs up its digital data remotely from the location of the primary data center 512 to help ensure data is available for recovery.

The primary data center 512 includes a primary unstructured data storage 520, an on-premises server 522, a local-area network (LAN) 524, a transceiver 526, and computers 527, 528, 529. The primary unstructured data storage 520 may be, for example, a disk drive or an SSD (solid state drive). The primary unstructured data storage 520 may include, and/or may be communicatively coupled to, a processor containing non-transitory processor-readable memory storing appropriate processor-readable instructions configured to cause the processor to perform functions discussed herein as being performed by the primary unstructured data storage 520. Here, the primary unstructured data storage 520 may store active unstructured data and/or inactive unstructured data. Storage for structured data is not shown and all data stored in the primary unstructured data storage 520 are unstructured data. Active data are data that have recently been accessed, e.g., previously accessed per a request of one of the computers 527-529 within a threshold amount of time such as one year from the present time. Inactive data are data that have not been recently accessed, e.g., with a last access having been more than a threshold amount of time ago such as one year. The unstructured data are typically not as easily searchable as structured data and may include data files, e.g., of text documents, audio files, video files, emails, social media postings, etc. The on-premises server 522 stores unstructured data 530 for the primary data center. While shown in the primary data center 512, the primary unstructured data storage 520 need not be on the same premises (e.g., in the same building) as other portions of the primary data center 512, but is typically is disposed at the same premises as other portions of the primary data center 512. The on-prem server 522 includes an agent 521 that may comprise software executed by a processor of the on-prem file server 522 to back up data from the primary unstructured data storage 520 in a backup unstructured data storage 544 of the secondary data center 514, and to restore (bring back) data from the backup unstructured data storage 544, e.g., to a replacement of the primary unstructured data storage 520. Backup of structured data is not shown, and all of the data stored in the backup unstructured data storage 544 are unstructured data. The agent 521 can communicate with a backup server 542 of the secondary data center 514 to transfer data between the primary unstructured data storage 520 (or a replacement of the primary unstructured data storage 520) and the backup unstructured data storage 544, via the backup server 542, a transceiver 540 of the secondary data center 514, the Internet 515, the transceiver 526, and the LAN 524, for data backup and data restore as desired. The LAN 524 provides bi-directional communication between the on-prem server 522, the transceiver 526, and the computers 527-529. The computers 527-529 are shown as laptop computers, but other forms of computers (e.g., desktop, tablet, etc.) or communication devices (e.g., mobile phones) may be used. The computers 527-529 are configured to communicate with the LAN 524 to request access to data, and possibly to manipulate the accessed data. The transceiver 526 is configured to communicate bi-directionally with the LAN 524 and the Internet 515 to relay information, such as data requests, data, commands, etc., between the LAN 524 and the Internet 515.

The second data center 514 includes the transceiver 540, the backup server 542, and the backup unstructured data storage 544. The backup unstructured data storage 544 is a memory and stores backup data 546, e.g., copies of the (active and inactive) unstructured data 530 stored by the primary unstructured data storage 520. The backup server 542 coordinates access to and retrieval of data from the backup unstructured data storage 544 of the backup data 546 and provision of data to be stored in the backup unstructured data storage 544. The backup server 542 is bi-directionally communicatively coupled to the backup unstructured data storage 544 and the transceiver 540. The transceiver 540 is bi-directionally communicatively coupled to the backup server 542 and the Internet 515 and configured to receive data to be backed up from the primary data center 512 via the Internet 515 and to forward these data to the backup server 542, and to receive retrieved data (e.g., to be restored) from the backup unstructured data storage 544 via the backup server 542 and send these data to the primary data center 512 via the Internet 515.

Data from the primary unstructured data storage 520 may be backed up at the secondary data center, and data recovered from the secondary data center 514 as appropriate, e.g., if data in the primary unstructured data storage 520 is rendered inaccessible, e.g., due to the primary unstructured data storage 520 being damaged or destroyed, or blocked by ransomware. For example, if the primary unstructured data storage 520 is ruined, a replacement primary data storage may be purchased and connected to the on-premises server 522, and the backup data 546 may be retrieved from the backup unstructured data storage 544 and stored in the replacement primary data storage. All of the unstructured data are stored at both the primary unstructured data storage 520 (before replacement and restoration, and on the replacement primary data storage in the case of replacement and restoration) and the backup unstructured data storage 544. For disaster recovery, the active and inactive data are sent from the backup unstructured data storage 544 to the primary unstructured data storage 520 via the backup server 542, the transceiver 540, the Internet 515, the transceiver 526, the LAN 524, and the on-prem server 522.

SUMMARY

An example data access recovery apparatus includes: first receiving means for receiving a request to restore backed-up unstructured data files associated with the request; first sending means for sending active data files, of the backed-up unstructured data files, to a data-access server in response to receiving the request; second receiving means for receiving an indication of a particular data file of the backed-up unstructured data files; and second sending means for sending, in response to receiving the indication, the particular data file to the data-access server before the particular data file would be sent, if at all, absent receiving the indication.

Implementations of such an apparatus may include one or more of the following features. The apparatus includes means for sending, in response to receiving the request, a plurality of Virtual Data Files (VDFs) to the data-access server, each VDF of the plurality of VDFs being indicative of a respective one of the backed-up unstructured data files. Each of the plurality of VDFs comprises a pointer to a respective portion of a data storage storing the respective one of the backed-up unstructured data files for generation of the indication. The apparatus includes means for determining, from the backed-up unstructured data files, the plurality of VDFs. The second sending means are for sending the particular data file in response to the indication indicating selection of a particular VDF, of the plurality of VDFs, corresponding to the particular data file. A first portion of the plurality of VDFs correspond to the active data files of the backed-up unstructured data files and a second portion of the plurality of VDFs correspond to inactive data files of the backed-up unstructured data files. The first sending means are configured to begin sending the active data files to the data-access server after the means for sending the plurality of VDFs sends the plurality of VDFs.

Also or alternatively, implementations of such an apparatus may include one or more of the following features. The second sending means include means for interrupting sending the active data files to send the particular data file. The second sending means include means for sending the particular data file at a next possible opportunity after receiving the indication. The apparatus includes means for scheduling the active data files to be sent in a first order, and the second sending means include: means for changing the first order, based on the first order lacking the particular data file, to a second order that includes the particular data file; or means for changing the first order, based on the first order including the particular data file, to a third order that includes the particular data file earlier than in the first order.

Another example data access recovery apparatus includes: a transceiver; a memory; and a processor communicatively coupled to the transceiver and the memory and configured to: receive a request to restore backed-up unstructured data files associated with the request; send active data files, of the backed-up unstructured data files, to a data-access server in response to receiving the request; receive an indication of a particular data file of the backed-up unstructured data files; and send, in response to receiving the indication, the particular data file to the data-access server before the particular data file would be sent, if at all, absent receiving the indication.

Implementations of such an apparatus may include one or more of the following features. The processor is configured to, in response to receiving the request, send a plurality of Virtual Data Files (VDFs) to the data-access server, each VDF of the plurality of VDFs being indicative of a respective one of the backed-up unstructured data files. Each of the plurality of VDFs includes a pointer to a respective portion of a data storage storing the respective one of the backed-up unstructured data files for generation of the indication. The apparatus includes means for determining, from the backed-up unstructured data files, the plurality of VDFs. The processor is configured to send the particular data file in response to the indication indicating selection of a particular VDF, of the plurality of VDFs, corresponding to the particular data file. A first portion of the plurality of VDFs correspond to the active data files of the backed-up unstructured data files and a second portion of the plurality of VDFs correspond to inactive data files the backed-up unstructured data files. The processor is configured to begin sending the active data files to the data-access server after the processor sends the plurality of VDFs. The plurality of VDFs comprise a complete set of VDFs for the backed-up unstructured data files.

Also or alternatively, implementations of such an apparatus may include one or more of the following features. The processor is configured to interrupt sending the active data files to send the particular data file. The processor is configured to send the particular data file at a next possible opportunity after receiving the indication. The processor is configured to: schedule the active data files to be sent in a first order; and at least one of: change the first order, based on the first order lacking the particular data file, to a second order that includes the particular data file; or change the first order, based on the first order including the particular data file, to a third order that includes the particular data file earlier than in the first order.

An example non-transitory, processor-readable storage medium includes processor-readable instructions configured to cause a processor of an apparatus, in order to manage a data restore, to: initiate, in response to a first data restore request, a data transfer of active unstructured data to a server via an interface of the apparatus, the active unstructured data comprising at least a portion of backed-up unstructured data that are associated with the first data restore request; and send, via the interface of the apparatus in response to a second data restore request corresponding to an identified data portion of the backed-up unstructured data, the identified data portion to the server before the identified data portion would be transferred, if at all, to the server as part of the data transfer absent the second data restore request.

Implementations of such a storage medium may include one or more of the following features. The storage medium includes processor-readable instructions configured to cause the processor to, in response to receiving the first data restore request, send a plurality of Virtual Data Files (VDFs) to the server, each VDF of the plurality of VDFs being indicative of a respective backed-up unstructured data file of the backed-up unstructured data. The instructions configured to cause the processor to initiate the data transfer of the active unstructured data are configured to cause the processor to initiate the data transfer of the active unstructured data after a complete set of the plurality of VDFs for the backed-up unstructured data are sent to the server.

Also or alternatively, implementations of such a storage medium may include one or more of the following features. To cause the identified data portion to be transferred to the server, the instructions are configured to cause the processor to prioritize the transfer of the identified data portion above other portions of the backed-up unstructured data. To cause the identified data portion to be transferred to the server, the instructions are configured to cause the processor to interrupt the transfer of the active unstructured data to the server. To cause the identified data portion to be transferred to the server, the instructions are configured to cause the processor to put the identified data portion at a front of a queue of unstructured data to be transferred to the server. Each of the plurality of VDFs provides a pointer to a respective identified portion of the backed-up unstructured data for generation of a respective specific data restore request. A first portion of the plurality of VDFs corresponds to active data of the backed-up unstructured data and a second portion of the plurality of VDFs corresponds to inactive data of the backed-up unstructured data. The storage medium includes instructions configured to cause the processor to determine the plurality of VDFs based on the backed-up unstructured data. The instructions are configured to cause the processor to establish a first order in which the active unstructured data are to be transferred to the server, and wherein to cause the identified data portion to be transferred to the server the instructions are configured to cause the processor to: change the first order, if the first order lacks the identified data portion, to a second order that includes the identified data portion; or change the first order, if the first order includes the identified data portion, to a third order that includes the identified data portion nearer to a front of the third order than to a front of the first order.

An example data management system includes: accessing means for accessing a first data storage device storing a plurality of backed-up files of unstructured data; means for receiving a data request requesting unstructured data from the first data storage device; means for sending, in response to the data request, a plurality of Virtual Data Files (VDFs) to a second data storage device, each VDF of the plurality of VDFs including information usable by the accessing means for accessing a respective backed-up file of unstructured data of the plurality of backed-up files of unstructured data stored in the first data storage device.

Implementations of such a system may include one or more of the following features. The data management system includes means for sending a particular backed-up file of unstructured data, of the plurality of backed-up files of unstructured data, from the first data storage device to the second data storage device in response to receiving an indication of a selection of a particular VDF, of the plurality of VDFs, corresponding to the particular backed-up file of unstructured data. Each VDF of the plurality of VDFs comprises a pointer to the respective backed-up file of unstructured data. The data management system includes means for determining the plurality of VDFs from the plurality of backed-up files of unstructured data. A first portion of the plurality of VDFs correspond to active data files of the plurality of backed-up files of unstructured data and a second portion of the plurality of VDFs correspond to inactive data files the plurality of backed-up files of unstructured data. The data management system includes means for automatically sending at least one of the plurality of backed-up files of unstructured data to the second data storage device based on an implicit request for data files in the data request. The data request comprises an indication of a purpose for the data request, the purpose comprising at least one of performance analysis, quality assurance, development, or training.

Another example data management system includes: a transceiver; a memory; and a processor communicatively coupled to the transceiver and the memory and configured to: receive, via the transceiver, a copy data request for unstructured data; access, via the transceiver in response to the copy data request, a plurality of backed-up files of unstructured data stored in a first data storage device; send, in response to the copy data request, a plurality of Virtual Data Files (VDFs) to a second data storage device, the processor being configured to respond to receipt of information from each of the plurality of VDFs to retrieve a respective backed-up file of unstructured data of the plurality of backed-up files of unstructured data stored in the first data storage device.

Implementations of such a system may include one or more of the following features. Each VDF of the plurality of VDFs comprises a pointer to the respective backed-up file of unstructured data. The processor is configured to determine the plurality of VDFs from the plurality of backed-up files of unstructured data. The processor is configured to send at least one of the plurality of backed-up files of unstructured data to the second data storage device based on an implicit request in the copy data request. The implicit request comprises an indication of a purpose for the copy data request, the purpose comprising at least one of performance analysis, quality assurance, development, or training. The processor is configured to send at least one of the plurality of backed-up files of unstructured data to the second data storage device based on an explicit request in the copy data request.

An example data management method includes: receiving, at a server, a copy data request for unstructured data; accessing, by the server in response to the copy data request, a plurality of backed-up files of unstructured data stored in a first data storage device; sending, from the server in response to the copy data request, a plurality of Virtual Data Files (VDFs) to a second data storage device, the server being configured to respond to receipt of information from each of the plurality of VDFs to retrieve a respective backed-up file of unstructured data of the plurality of backed-up files of unstructured data stored in the first data storage device.

Implementations of such a method may include one or more of the following features. Each VDF of the plurality of VDFs comprises a pointer to the respective backed-up file of unstructured data. The data management method includes determining the plurality of VDFs from the plurality of backed-up files of unstructured data. A first portion of the plurality of VDFs correspond to active data files of the plurality of backed-up files of unstructured data and a second portion of the plurality of VDFs correspond to inactive data files the plurality of backed-up files of unstructured data. The data management method includes sending at least one of the plurality of backed-up files of unstructured data to the second data storage device based on an implicit request in the copy data request. The copy data request comprises an indication of a purpose for the copy data request, the purpose comprising at least one of performance analysis, quality assurance, development, or training. The data management method includes sending at least one of the plurality of backed-up files of unstructured data to the second data storage device based on an explicit request in the copy data request.

DETAILED DESCRIPTION

Figure 1:
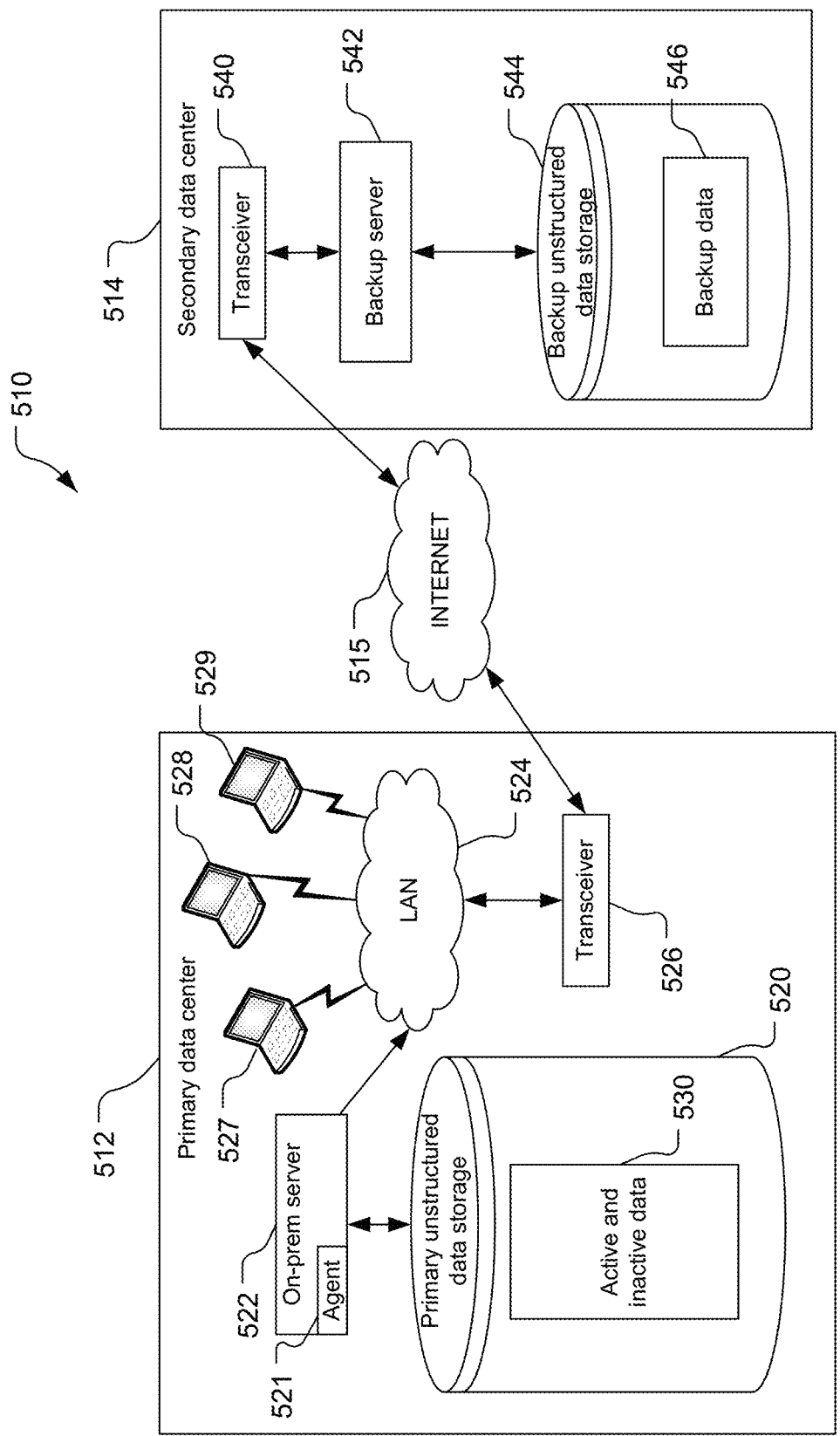
FIG. 1 is a simplified block diagram of a prior art data storage and retrieval system with a primary data center and a secondary data center.

Techniques are discussed herein for backing up unstructured data (including high-value data), e.g., to the cloud or an independent backup server, and/or virtualizing all or a portion of the data using Virtual Data Files (VDFs). A VDF may appear like the original data file that the VDF represents, e.g., with the same or similar icon as the file that the VDF represents, to the file system or a user of the file system and may provide secure, on-demand access (e.g., via a pointer) to a validated copy of the original data file, e.g., stored in the cloud or on the independent backup server. The recovery of the VDFs in case of a complete loss of data is also described herein. Unstructured data may be stored in a primary (e.g., on premises) storage device and backed up on a backup storage device. In response to a request for backed-up data (e.g., a request to copy data to another storage device or a request to populate a new primary storage device used, e.g., if some or all of the unstructured data stored in the primary storage device becomes inaccessible), VDFs indicative of respective portions of the unstructured data may be provided to the other storage device (a copy storage device) or the new primary storage device. The VDFs may be determined in response to the request, or may be determined before this time, e.g., intermittently or each time there is a change in the unstructured data for which a change in VDFs is warranted (e.g., a change in file system architecture, including labeling). A file system architecture may be provided for the unstructured data and may be used, by being selected, to access the VDFs and a VDF may be selected to obtain a respective portion of the unstructured data, e.g., a data file, from the secondary storage device. In response to a request to recover the unstructured data, e.g., to recover from a disaster involving the primary data storage device, the VDFs may be provided to a primary server for a replacement primary data storage device and a backup server for the backup storage device may begin providing all or a portion of the unstructured data to the primary server. In an example implementation, all the VDFs may be sent to the primary server for the replacement primary data storage before any of the actual unstructured data files are sent to the primary server. This may provide extremely rapid restoration of full functionality during the recovery process, since as soon as all the VDFs have been transferred into the replacement primary data storage, the system may be immediately fully operational. This is in contrast to the much longer time that would be required if all the data files had to be transferred into the replacement primary data storage before the system could again be considered fully operational. In the example implementation, subsequent to sending the VDFs to the replacement primary backup storage, the unstructured data, as appropriate (e.g., requested), can be sent to the primary server while the system may retain full operational status.

While unstructured data are being provided to the primary server, a VDF may be selected by the primary server, causing a request for the respective portion of the unstructured data indicated by the selected VDF (the selected unstructured data) to be sent to the backup server. The backup server may respond to the received request corresponding to the selected VDF by accessing and sending the selected unstructured data to the primary server earlier than if the VDF had not been selected. For example, the backup server may send the selected unstructured data as soon as possible, e.g., during a next-available slot for transferring data to the primary server. In response to a data copy request, the backup server may provide the VDFs and the file system architecture to the copy storage device. The backup server may also provide some of the unstructured data, e.g., the active unstructured data, automatically, and can provide any unstructured data indicated by the request.

Data, such as inactive unstructured data, may be replaced in the primary data storage by VDFs. For example, if a portion of unstructured data, e.g., a data file, in the primary data storage has not been accessed for at least an access threshold amount of time, and/or has not been modified for at least a modification threshold amount of time (which may be different than the access threshold amount of time), then the portion of the unstructured data may be considered to be inactive. A function of time since a most-recent access and a time since a most-recent modification may be used to determine whether data are inactive. A VDF corresponding to an inactive data file may be produced and saved in the primary data storage. The inactive data file is stored in a backup storage device and in at least one other storage device. The memory used to store the inactive data file in the primary storage device may be used to store other, active, data. Also or alternatively, one or more other criteria may be used to determine to replace unstructured data in the primary storage with a VDF. For example, if a file unstructured data has a particular file type and/or exceeds a threshold file size, then the file may be replaced with a VDF. Also, one of more of the above criteria may be used in combination (e.g., up to a certain file size one access timer threshold may be used, whereas above that threshold a different access timer threshold may be used).

Virtual (e.g., cloud) storage for unstructured data may provide a solution to store and protect unstructured data in the cloud and to virtualize the inactive data with VDFs. This unique approach may allow companies to reduce the server storage consumption for inactive unstructured data on high-cost server storage and backup infrastructure. VDFs may provide companies the ability to recovery access of their unstructured data stored in the cloud faster, possibly over 90% faster, than typical on-premises and cloud-based backup solutions. Also, VDFs may be used to quickly provide secure on-demand access to a company's unstructured data on both private and public cloud servers without migrating all data between these environments. Such virtual storage for unstructured data may also be implemented not only in the cloud, but on any independent server (e.g., an on-premises backup server, a remote backup server) via any form of bi-directional communication link (e.g., private cloud, VPN, direct connection, etc.).

Items and/or techniques described herein may provide one or more of the following capabilities, as well as other capabilities mentioned above and other capabilities not mentioned. Additional storage space required or used for copy data may be reduced, e.g., by storing VDFs instead of unstructured data. Corresponding costs for such additional storage space may be reduced. Costs associated with recovery of data from a cloud-based storage device may be avoided or reduced. Time for recovery of data, e.g., selected unstructured data, and for recovery of system functionality after a loss due to a disaster or a ransomware attack, may be reduced, e.g., to be on the order of minutes. Unstructured data may be recovered on an on-demand basis. A schedule of data recovery may be altered on demand. On-demand data storage in a cloud-based storage device may be provided for on-demand computing. Primary storage device usage may be reduced, e.g., by up to 80-95%, by avoiding storing inactive unstructured data on the primary storage device. Cloud storage use and cost may be reduced by replacing unstructured data with smaller VDFs that provide on-demand access to real data stored in cloud-based storage. Commitment to a cloud-computing provider may be avoided, and/or data control improved, by not storing all unstructured data with the cloud-computing provider. Cost of migration of data from older storage to newer storage technologies may be reduced. Other capabilities may be provided and not every implementation according to the disclosure must provide any, let alone all, of the capabilities discussed.

Figure 2:
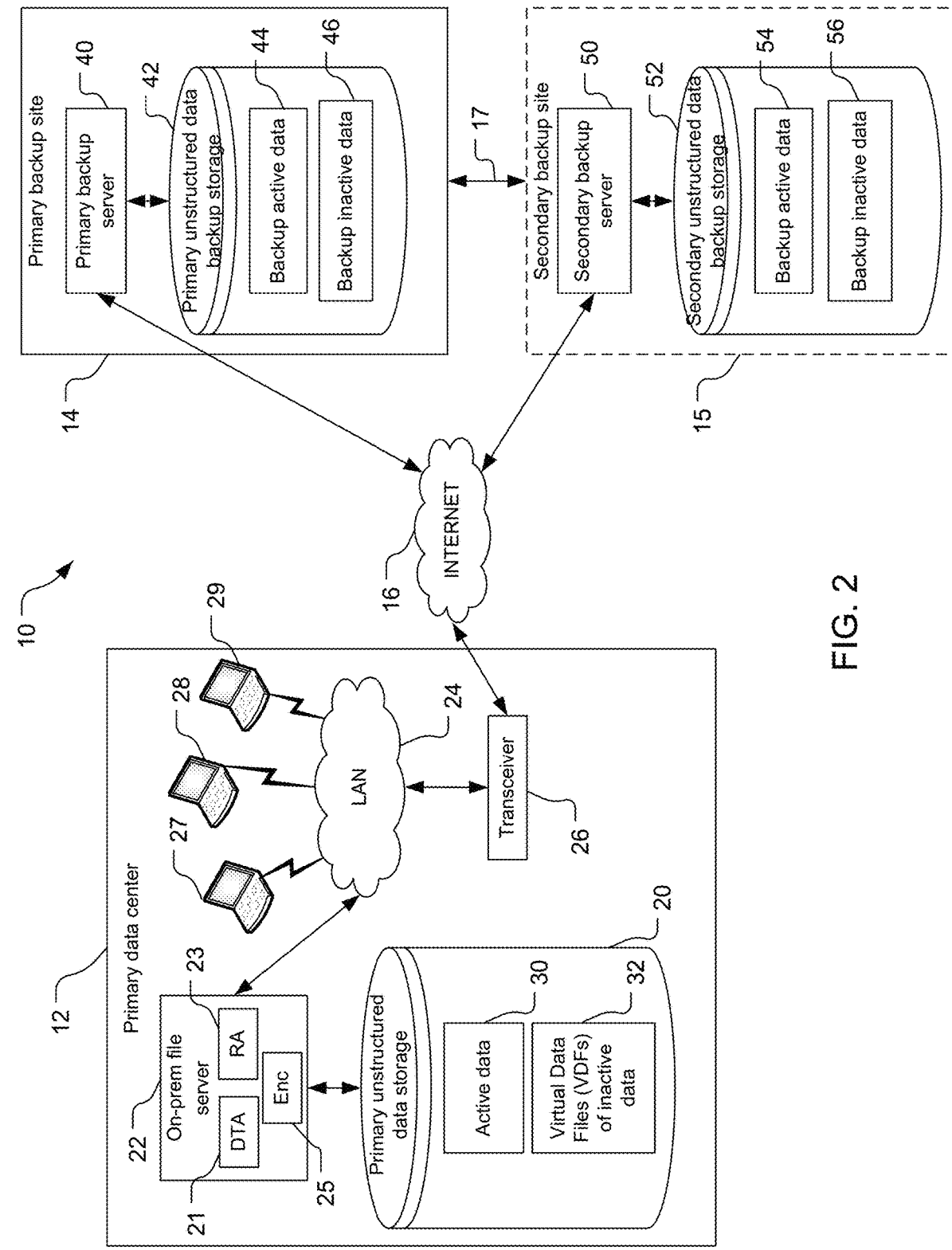
FIG. 2 is a simplified block diagram of a data storage and retrieval system storing data files on premises for active data and storing Virtual Data Files on premises for inactive data.

Referring to FIG. 2, a data storage and retrieval system 10 includes a primary data center 12, a primary backup site 14, a secondary backup site 15, and the Internet 16. While the Internet 16 is shown, this is an example and another network, e.g., another publicly-accessible, packet-switched communication network could be used instead of the Internet 16 in FIG. 2 and in other figures discussed below. Also or alternatively, one or more other connections may be used, e.g., a private cloud, VPN, and/or a direct connection 17 could be used for communication instead of or in addition to the Internet 16 (or other network) in FIG. 2 and in other figures discussed below. The primary data center 12, the primary backup site 14, the secondary backup site 15, and the Internet 16 are configured such that the Internet 16 can communicate bi-directionally with each of the primary data center 12, the primary backup site 14, and the secondary backup site 15. The primary data center 12 may be, for example, a business, or part of a business, that uses digital data and backs up the digital data remotely from the location of the primary data center 12 to help ensure data are available for recovery, e.g., disaster recovery. Data for use by devices associated with the primary data center are stored at the primary data center and backed up (e.g., for use in disaster recovery) at the primary backup site 14 and the secondary backup site 15.

The primary data center 12 includes a primary unstructured data storage 20, an on-premises server 22, a local-area network (LAN) 24, a transceiver 26, and computers 27, 28, 29. The primary unstructured data storage 20 may be, for example, a disk drive or an SSD (solid state drive). The primary unstructured data storage 20 may include, and/or may be communicatively coupled to, a processor containing non-transitory processor-readable memory storing appropriate processor-readable instructions configured to cause the processor to perform functions discussed herein as being performed by the primary unstructured data storage 20. The primary unstructured data storage 20 stores unstructured data for common access by the computers 27-29, which the computers 27-29 may access from the storage 20, or provide to the storage 20, via the LAN 24 and the server 22. Storage of structured data is not shown, and all of the active data stored by the primary unstructured data storage is unstructured data. While called the on-premises file server 22, the server 22 need not be (though often is) physically located in the primary data center 12 or co-located with other components shown in the primary data center 12. The on-premises server 22 controls the storage and retrieval of data from the primary unstructured data storage 20. As discussed further below, the server 22 also controls the backing up of the data stored in the primary unstructured data storage 20, and the accessing of data from the primary backup site 14 that has been backed up and no longer stored in the primary unstructured data storage 20. Also as further discussed below, the server 22 may request restoration of data from the primary backup site 14 (or the secondary backup site 15) and alter the restoration sequence of data from the primary backup site 14 (or the secondary backup site 15). The LAN 24 is configured to act as an intermediary between the server 22, the transceiver 26, and the computers 27-29 to convey information between these entities. The LAN 24 provides bi-directional communication between the LAN 24 and the on-prem server 22, the transceiver 26, and the computers 27-29. The computers 27-29 are shown as laptop computers, but other forms of computers (e.g., desktop, tablet, etc.) or communication devices (e.g., mobile phones) may be used. The computers 27-29 are configured to communicate with the LAN 24 to request access to data, and possibly to manipulate the accessed data. The transceiver 26 is communicatively coupled to, and configured to communicate bi-directionally with, the LAN 24 and the Internet 16 to relay information, such as data requests, data, commands, etc., between the LAN 24 and the Internet 16. The transceiver 26 is configured to send information to, and receive information from, the LAN 24 and to send information to, and receiving information from, the Internet 16. The transceiver 26 is thus configured to be a network interface for interacting with the Internet 16. The transceiver 26 is configured to receive data to be backed up from the server 22 and to forward these data to the primary backup server 40 and/or a secondary backup server 50 via the Internet 16, and to receive retrieved data (e.g., to be restored) from a primary unstructured data backup storage 42 via a primary backup server 40 and the Internet 16 and send these data to the server 22 for storage in the primary unstructured data storage 20. Backup of structured data is not shown, and all of the data stored in the primary backup unstructured data storage 42 are unstructured data, here backup active data 44 and backup inactive data 46.

Here, the primary unstructured data storage 20 stores (unstructured) active data 30. Active data are data that have recently been accessed, e.g., previously accessed per a request of one of the computers 27-29 within a threshold amount of time such as within one year from the present time. For example, if an inactive data file is accessed, that data file becomes an active data file, but may become inactive again if the data file is not accessed again within the threshold amount of time. An active data file remains active until the threshold amount of time has passed since the last access of that data file. Unstructured data are not structured data in that the unstructured data are typically not readily searchable. The unstructured data include data files (e.g., word-processing documents such as Word® documents, spreadsheets, emails, presentations such as PowerPoint® documents, drawings, photographs, portable document format (PDF) documents, audio files, video files, social media postings, etc.). The unstructured data may be stored in a local (e.g., on premises) storage device of the primary unstructured data storage 20 such as a solid-state drive (SSD) redundant array of independent disks (RAID).

Also in this example, the primary unstructured data storage 20 stores Virtual Data Files (VDFs) of inactive unstructured data 32. The VDFs provide information that can be used to access corresponding unstructured data, e.g., shortcuts (e.g., pointers) to corresponding unstructured data stored in the primary backup site 14. The corresponding unstructured data for a VDF is a (single) data file. Inactive data are data that have not been recently accessed, e.g., read, edited, sent, etc. For example, inactive data may be data with a last access having been more than a threshold amount of time ago such as one year. The VDFs consume very little memory, e.g., one or more kBytes each, but provide links to the unstructured data indicated by the VDFs. For example, a VDF may consume fewer bytes than the unstructured data file to which the VDF refers by an order of magnitude or more, e.g., four (4) kBytes for the VDF and 200 kBytes for the corresponding unstructured data file (thus, the VDF is 50 times smaller than the corresponding data file). A request for the corresponding unstructured data may be produced and sent (e.g., by the server 22 to the primary backup site 14) in response to selection of a VDF, e.g., selection of an indication (e.g., a data file icon and name of the data file) of the corresponding unstructured data via a user interface of one of the computers 27-29. The VDFs may be determined and provided by the primary backup site 14, e.g., with a VDF being provided upon request of the on-premises file server 22 in response to determining that a data file is or has become inactive.

The primary unstructured data storage 20, or a portion thereof, may be stored in a separate building from the primary data center 12 and may be accessible from the server 22, e.g., via the LAN 24. While shown in the primary data center 12, the primary unstructured data storage 20 (or a portion thereof) need not be on the same premises (e.g., in the same building) as other portions of the primary data center 12, but is typically disposed at the same premises as other portions of the primary data center 12.

Data from the primary unstructured data storage 20 may be backed up at the primary backup site 14, and data may be recovered from the primary backup site 14 as appropriate, e.g., if data in the primary unstructured data storage 20 is rendered inaccessible, e.g., due to the primary unstructured data storage 20 being damaged or destroyed, or blocked by ransomware. For example, if the primary unstructured data storage 20 is ruined, a replacement primary unstructured data storage may be purchased and connected to the on-premises server 22 and backed-up active data retrieved from the backup active data 44 and stored in the replacement primary unstructured data storage. VDFs of inactive data may be received from the primary backup site 14 and stored in the replacement primary unstructured data storage.

Figure 3:
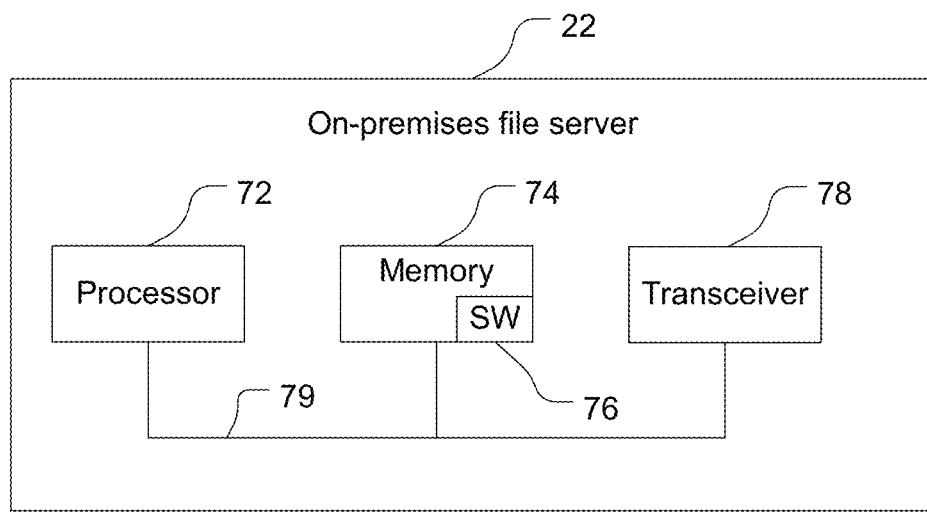
FIG. 3 is a simplified block diagram of a server shown in FIG. 2.

Referring to FIG. 3, with further reference to FIG. 2, an example of the on-premises server 22 comprises a computer system including a processor 72, a memory 74 including software (SW) 76, and a transceiver 78 communicatively coupled to each other by a bus 79. The processor 72 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 72 may comprise multiple separate physical entities that can be distributed in the server 22. The memory 74 may include random access memory (RAM) and/or read-only memory (ROM). The memory 74 is a non-transitory, processor-readable storage medium that stores the software 76 which is processor-readable, processor-executable software code containing instructions that are configured to, when performed, cause the processor 72 to perform various functions described herein. The description may refer only to the processor 72 or the server 22 performing the functions, but this includes other implementations such as where the processor 72 executes the software 76 and/or firmware. The software 76 may not be directly executable by the processor 72 and instead may be configured to, for example when compiled and executed, cause the processor 72 to perform the functions. Whether needing compiling or not, the software 76 contains the instructions to cause the processor 72 to perform the functions. The processor 72 is communicatively coupled to the memory 74. The processor 72 in combination with the memory 74 and/or the transceiver 78 provide means for performing functions as described herein. The software 76 may be loaded onto the memory 74 by being downloaded via a network connection, uploaded from a disk, etc.

The transceiver 78 is configured to communicate with other entities in the server 22 and one or more entities outside the server 22, e.g., serving as a liaison between internal and external entities. The transceiver 78 may be configured to communicate bi-directionally with the LAN 24, and also with the Internet 16. The transceiver 78 may include a network interface card (NIC) for communicating with the Internet 16. The transceiver 78 is communicatively coupled to the processor 72 and the memory 74 and configured to transfer information from the processor 72 and/or the memory 74 to the Internet 16 and vice versa and/or to the LAN 24 and vice versa.

Figure 4:
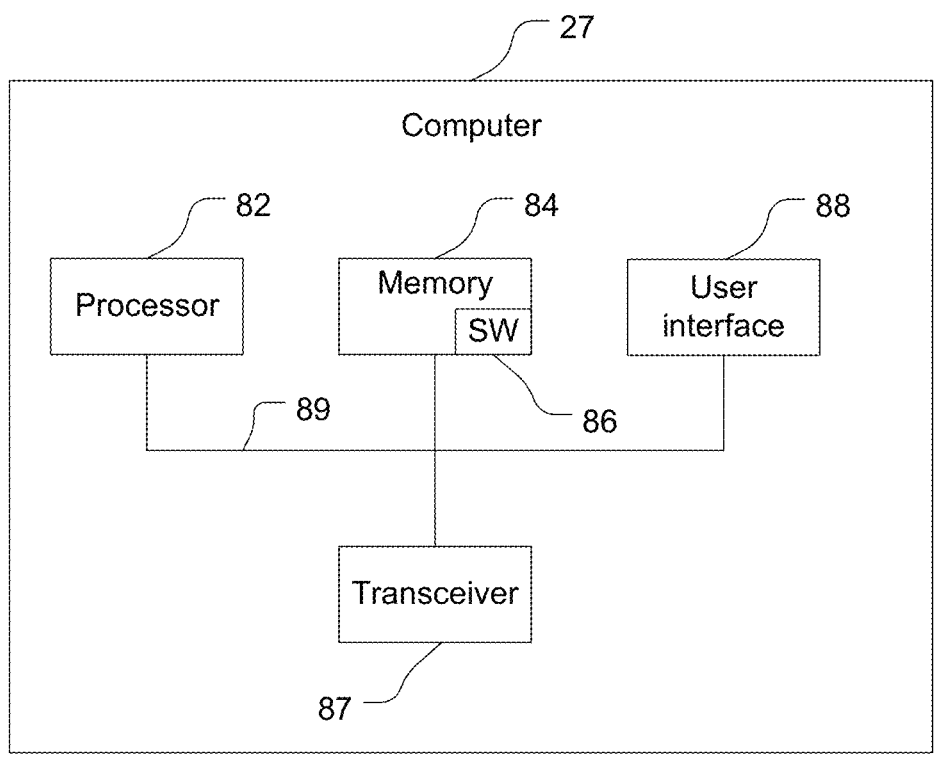
FIG. 4 is a simplified block diagram of a computer shown in FIG. 2.

Referring to FIG. 4, with further reference to FIG. 2, an example of one of the computers 27-29, here the computer 27, comprises a computer system including a processor 82, a memory 84 including software (SW) 86, a user interface 88, and a transceiver 87 communicatively coupled to each other by a bus 89. The processor 82 is preferably an intelligent hardware device, for example a central processing unit (CPU) such as those made or designed by QUAL-COMM®, ARM®, Intel® Corporation, or AMD®, a microcontroller, an application specific integrated circuit (ASIC), etc. The processor 82 may comprise multiple separate physical entities that can be distributed in the computer 27. The memory 84 may include random access memory (RAM) and/or read-only memory (ROM). The memory 84 is a non-transitory, processor-readable storage medium that stores the software 86 which is processor-readable, processor-executable software code containing instructions that are configured to, when performed, cause the processor 82 to perform various functions described herein. The description may refer only to the processor 82 or the computer 27 (or the computer 28 or the computer 29) performing the functions, but this includes other implementations such as where the processor 82 executes the software 86 and/or firmware. The software 86 may not be directly executable by the processor 82 and instead may be configured to, for example when compiled and executed, cause the processor 82 to perform the functions. Whether needing compiling or not, the software 86 contains the instructions to cause the processor 82 to perform the functions. The processor 82 is communicatively coupled to the memory 84. The processor 82 in combination with the memory 84 and/or the transceiver provide means for performing functions as described herein. The software 86 may be loaded onto the memory 84 by being downloaded via a network connection, uploaded from a disk, etc.

The user interface 88 may include one or more devices for interacting with a user. For example, the user interface 88 may include a display, such as a touch-sensitive display configured to show information and to receive user input, e.g., by the user touching the display. The user interface may include a microphone and/or one or more speakers for audible input from and output to, respectively, the user. Also or alternatively, the user interface may include a keyboard, a mouse, a trackball, and/or other input device (e.g., graphical input device) for input from the user.

The transceiver 87 is configured to communicate with other entities in the computer 27 and one or more entities outside the computer 27, e.g., serving as a liaison between internal and external entities. The transceiver 87 may be configured to communicate bi-directionally with the LAN 24. The transceiver 87 is communicatively coupled to the processor 82, the memory 84, and the user interface 88 and configured to transfer information from the processor 82, the memory 84, and/or the user interface 88 to the LAN 24 and vice versa.

Returning in particular to FIG. 3, with further reference to FIG. 2, the processor 72 in conjunction with the memory 74, and in particular the software 76, is configured to implement a data transport agent (DTA) 21 of the server 22 as shown in FIG. 2. The DTA 21 is configured to control transport of data, e.g., for backup or recovery, between the primary unstructured data storage 20 and the LAN 24. The DTA 21 is further configured to implement rules regarding storage of data in the primary unstructured data storage 20. For example, the DTA 21 may be configured to schedule backup transfers, e.g., being configured to implement one or more rules regarding how frequently to back data up by sending the data to the primary backup site 14. As another example, the DTA 21 may monitor the activity for each data file in the primary unstructured data storage 20 to determine whether each data file is active or inactive. The DTA 21 may be configured to coordinate replacement of inactive data with VDFs. The DTA 21 may determine that a data file is inactive (or has become inactive) if the data file has not been accessed in a threshold amount of time, e.g., a year. If a data file is or becomes inactive, then the DTA 21 may produce, in response to the data file being or becoming inactive, a VDF for the inactive data file and have the primary unstructured data storage 20 store the VDF and designate the space occupied by the inactive data file as available for being overwritten with active data. The DTA 21 may produce the VDF (and may coordinate with the primary backup site 14 to do so), or may receive the VDF from the primary backup site 14. It has been found that as much as 90% of data stored in on-premises storage is inactive, and thus that on-premises storage capacity could be reduced by about 90% by using VDFs for inactive data, retrieving the inactive data only when needed for active use, which is infrequent.

The processor 72 in conjunction with the memory 74, and in particular the software 76, is further configured to implement a retrieval agent (RA) 23 of the server 22 as shown in FIG. 2. The retrieval agent 23 is configured to provide a graphical user interface (GUI) for retrieval of data, e.g., retrieving data that has been replaced by a VDF, or restoring data (e.g., from the backup site 14 that were lost at the primary data center 12, e.g., due to a disaster). The retrieval agent 23 may cause graphics data to be provided to any of the computers 27-29 such that the user interface 88 of the respective computer 27-29 will display corresponding graphics, e.g., providing information about data storage and/or progress of one or more activities, prompting a user for input regarding data storage and/or recovery, etc. The graphics help the user to interact with the retrieval agent 23 although the retrieval agent 23 may not be resident on any of the computers 27-29.

The retrieval agent 23 is configured to respond to input from the computers 27-29, corresponding to input from the user through the user interface 88, to initiate one or more actions corresponding to the input. Such actions may include retrieving data, storing data, providing different graphics data to the computer 27-29 from which the input was received (e.g., to reflect the input), etc. The different graphics data may be responsive to the input and may, for example, cause the user interface 88 to change, reflecting the input and possibly the initiation of one or more actions by the retrieval agent 23. The retrieval agent 23 may be used (e.g., via graphics provided to, and input received from, a user of one of the computers 27-29) to identify and select what data to restore.

The RA 23 may be configured to respond to selection of one of the VDFs, e.g., selection by a remote user of the computer 27 selecting the VDF via communication through the LAN 24, by causing the DTA 21 to send a request corresponding to the selected VDF to the primary backup site 14 (or the secondary backup site 15) for data corresponding to the selected VDF from a location corresponding to the selected VDF. The corresponding data are retrieved from the backup site 14 and sent to the primary data center 12 using the DTA 21. If a VDF in the data 32 is selected and corresponding data retrieved from the primary backup site 14, then the DTA 21 may send the retrieved data to the storage 20 and cause the storage 20 to designate the memory storing the selected VDF as available to be overwritten.

The RA 23 may be configured to restore data from the primary unstructured data backup storage 42, e.g., by being configured to respond to an indication of a disaster by causing the DTA 21 to send a request to the primary unstructured data backup storage 42 to restore all the backed-up data (or at least active backed-up data) in the primary unstructured data backup storage 42 to the on-prem file server 22, e.g., for storage in a replacement primary data storage. The RA 23 and/or the DTA 21 may be configured to produce the restore request to request VDFs of all the backed-up data, and also all of the backed-up data, or at least all of the active backed-up data stored in the backup active data 44. The request may request the VDFs to be provided before the backed-up data, or the backup server 40 may be configured to respond to the restore request by providing the VDFs before the backed-up data, or at least before all of the backed-up data to be restored are restored (e.g., early in the data restore process even if after some backed-up data are restored). The DTA 21 is configured to receive the restored data from the primary unstructured data backup storage 42 (or a secondary unstructured data backup storage 52 of the secondary backup site 15) and to convey the restored data to a replacement primary unstructured data storage (or to the primary unstructured data storage 20, e.g., if data were deleted from the primary unstructured data storage 20 but the primary unstructured data storage 20 could still be used for storing data).

The processor 72 in conjunction with the memory 74, and in particular the software 76, is further configured to implement an encryption subsystem (Enc) 25 of the server 22 as shown in FIG. 2. The encryption subsystem 25 is configured to perform one or more actions and/or provide information to enable encryption of "in-flight data," i.e., information passing between the primary data center 12 and the primary backup site 14 (and/or other site such as the secondary backup site 15), e.g., for data backup or data recovery (e.g., retrieval or restore). For example, the subsystem 25 may store a Secure Sockets Layer (SSL) certificate for use in proving ownership of a cryptographic key for encrypting and decrypting data in accordance with Advanced Encryption Standard (AES) encryption techniques.

Figure 5:
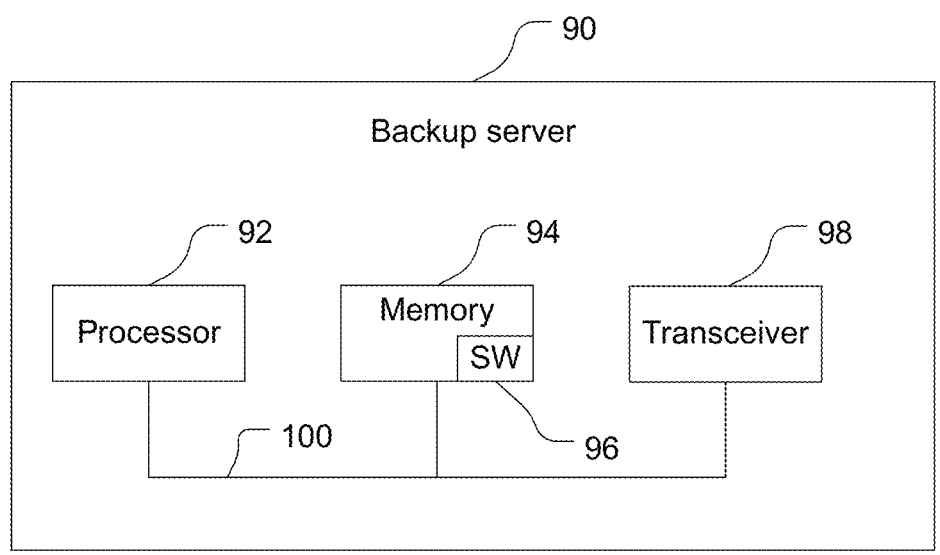
FIG. 5 is a simplified block diagram of a backup server shown in FIG. 2.

Referring to FIG. 5, with further reference to FIG. 2, a server 90, which is an example of the primary backup server 40, comprises a computer system including a processor 92, a memory 94 including software (SW) 96, and a transceiver 98 communicatively coupled to each other by a bus 100. The processor 92 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 92 may comprise multiple separate physical entities that can be distributed in the server 40. The memory 94 may include random access memory (RAM) and/or read-only memory (ROM). The memory 94 is a non-transitory, processor-readable storage medium that stores the software 96 which is processor-readable, processor-executable software code containing instructions that are configured to, when performed, cause the processor 92 to perform various functions described herein. The description may refer only to the processor 92 or the server 40 performing the functions, but this includes other implementations such as where the processor 92 executes the software 96 and/or firmware. The software 96 may not be directly executable by the processor 92 and instead may be configured to, for example when compiled and executed, cause the processor 92 to perform the functions. Whether needing compiling or not, the software 96 contains the instructions to cause the processor 92 to perform the functions. The processor 92 is communicatively coupled to the memory 94. The processor 92 in combination with the memory 94 and/or the transceiver 98 provide means for performing functions as described herein. The software 96 may be loaded onto the memory 94 by being downloaded via a network connection, uploaded from a disk, etc.

The transceiver 98 is configured to communicate with other entities in the server 90 and one or more entities outside the server 90, e.g., serving as a liaison between internal and external entities. The transceiver 98 may be configured to communicate bi-directionally with the Internet 16. The transceiver 98 may include a network interface card (NIC) for communicating with the Internet 16. The transceiver 98 is communicatively coupled to the processor 92 and the memory 94 and configured to transfer information from the processor 92 and/or the memory 94 to the Internet 16 and vice versa.

Referring again primarily to FIG. 2, with further reference to FIGS. 3-5, the primary backup site 14 includes the primary backup server 40 and the primary site data storage 42. The server 40 is communicatively coupled to the primary unstructured data backup storage 42, which may be any of a variety of types of memory for storing data, such as an SSD RAID. The storage 42 may include multiple types of storage. For example, the storage 42 includes the backup active data 44, that may be stored, e.g., on an SSD RAID, and the backup inactive data 46, that may be stored, e.g., on an optical disk and/or magnetic tape. The backup inactive data 46 may take longer to store and/or retrieve data, but is cheaper and may be used to store data that are less often needed than the active data. For example, the inactive data may be data that has not been accessed by one of the computers 27-29 in at least a threshold amount of time (e.g., a year or other threshold amount of time that may be programmed or otherwise determined). The data stored in the primary unstructured data backup storage 42 may be stored as encrypted data, e.g., to help prevent unauthorized access to the data, even if the security of the storage 42 is breeched. The unstructured data stored in the primary unstructured data backup storage 42 are stored in accordance with an organization of the data produced in the primary data center 12, e.g., in accordance with a system of folders and files. The primary backup server 40 may be configured to analyze the unstructured data stored in the backup active data 44 and the backup inactive data 46 to produce VDFs for the unstructured data. The server 40 may provide one or more of the VDFs to the primary data center 12, e.g., in response to a request for one or more VDFs, e.g., in response to a data file becoming inactive, and/or in response to a disaster recovery request, and/or in response to a copy data request. In response to a disaster recovery request or a copy data request, the server 40 may provide VDFs of the backup active data 44 and the backup inactive data 46. The server 40 may determine the VDFs in response to a request, or the server 40 may already have produced the VDFs. For example, the server 40 may produce the VDFs intermittently even without (absent) a request (e.g., periodically with a repeating interval between producing the VDFs).

The secondary backup site 15 may be configured similarly to the primary backup site 14, with the secondary backup site 15 including the secondary backup server 50 and the secondary unstructured data backup storage 52. Backup of structured data is not shown, and all of the data stored in the secondary unstructured data backup storage 52 are unstructured data. The secondary unstructured data backup storage 52, similar to the primary unstructured data backup storage 42, includes backup active data 54 and backup inactive data 56. Alternatively, both active and inactive data in the secondary backup storage may be stored in archive storage. The secondary backup server 50 may be configured similarly to the primary backup server 40 and include a transceiver (not shown) for transferring data between the server 50 and the Internet 16. The server 50 may be configured to back up data from the primary data center 12 or from the primary backup site 14. Thus, the secondary backup site 15 may not communicate with the primary data center 12 directly (i.e., without going through the primary backup site 14), but indirectly via the primary backup site 14 (and the Internet 16). The secondary backup site 15 may communicate with the primary data center 12 directly (albeit possibly through a network, here the Internet 16), e.g., in the event of a failure of the primary backup site 14.

Figure 6:
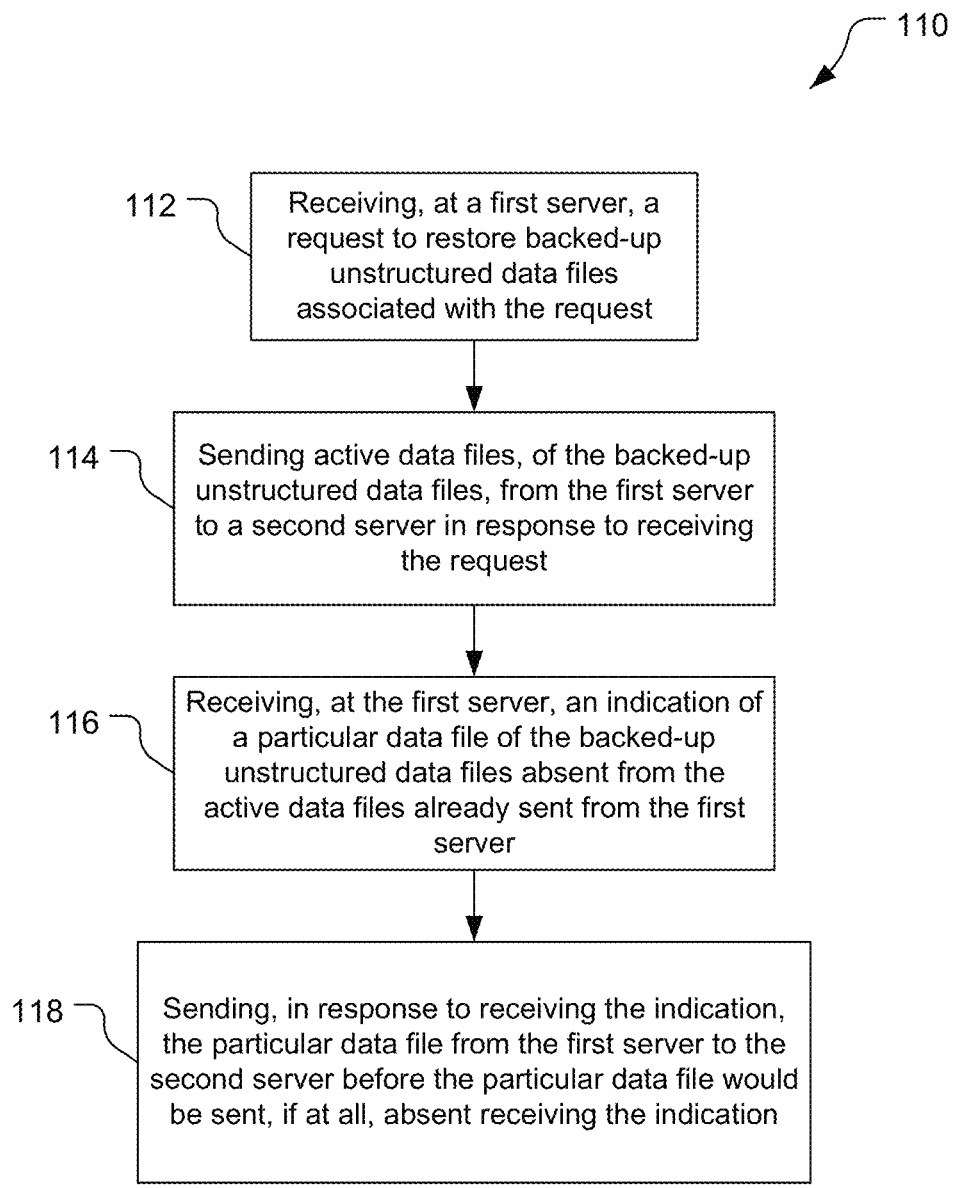
FIG. 6 is a block flow diagram of a data access recovery method.

Referring to FIG. 6, with further reference to FIGS. 2-5, a data access recovery method 110 includes the stages shown. The method 110 is, however, an example only and not limiting. The method 110 may be altered, e.g., by having stages added, removed, rearranged, combined, performed concurrently, and/or having single stages split into multiple stages. The method 110 may be useful in disaster recovery of data.

At stage 112, the method 110 includes receiving, at a first server (e.g., a data-backup server), a request to restore backed-up unstructured data files associated with the request. The request may be a general or group data file restore request (e.g., for all unstructured data files or only all active unstructured data files, or a specified subset of the unstructured data files) as opposed to a specific data file restore request (e.g., for one or more particular data files). For example, a user of the computer 27 may use the user interface 88 to interact with the server 22 to request disaster recovery data restore, e.g., after a replacement data storage is connected to the server 22. The server 22 may be a replacement server, e.g., if an event that destroyed the primary unstructured data storage 20 also destroyed the original server 22. The server 22 may respond to this request by sending the request to restore backed-up data to a backup server such as the primary backup server 40. The request sent to the backup server may be a request for only active data, or may be a request for active and inactive data. If inactive data are requested, the server 40 may send only the VDFs corresponding to the inactive data, or send the VDFs and then send the inactive data itself. In response to a backup request, the backup server, e.g., the primary backup server 40, may send a complete set of VDFs for backed-up unstructured data files associated with the request, e.g., all the backed-up unstructured data associated with requested data to be restored. The complete set of VDFs may be sent regardless of a type of restore request, e.g., whether the restore request was a general data file restore request or a group data file restore request. The processor 92, possibly in combination with the memory 94, in combination with the transceiver 98 may comprise means for receiving the request to restore backed-up unstructured data files.

At stage 114, the method 110 includes sending active data files, of the backed-up unstructured data files, from the first server to a second server (e.g., a data-access server) in response to receiving the request. For example, the backup server, such as the primary backup server 40, may initiate a data transfer to send active data files from the backup active data 44 to the on-premises file server 22. The active data files may be sent, for example, via a communication network such as a publicly-accessible communication network such as the Internet 16. The active data files to be transferred are associated with the request directly or indirectly, e.g., by identifying an owner of the active data files (e.g., restore ABC company's data), or by a source of the request corresponding to the active data files (e.g., request originated from an ABC company computer), etc. The server 40 may send the active data files to the server 22 in accordance with a predetermined schedule, or in accordance with a physical order in which the data files are stored in the backup active data 44, or in accordance with an order in time at which the data files were stored, or in accordance with another scheme. The processor 92, possibly in combination with the memory 94, in combination with the transceiver 98 may comprise means for sending active data files.

At stage 116, the method 110 includes receiving, at the first server, an indication of a particular data file of the backed-up unstructured data files absent from the active data files already sent from the first server. The indication of the particular data file is an example of a specific data restore request, and identifies a data portion to be transferred. The identified data portion may be a single data file. A user of the computer 27 may use the user interface 88 to interact with the server 22 to request a particular data file, that is identified (directly or indirectly) by the indication, that has not already been sent to the server 22 from the server 40. For example, the user can navigate through a file system architecture and select a VDF to initiate transmission of the indication, which may include content of the VDF (e.g., a pointer to a file). The particular data file may not be expected to be sent from the server 40 to the server 22 for some time, or at all (e.g., if the particular data file is an inactive data file), based on the scheme used by the server 40, that dictates the order in which the active data files will be sent to the server 22. The processor 92, possibly in combination with the memory 94, in combination with the transceiver 98 may comprise means for receiving an indication of a particular data file (e.g., a particular-data-file indication).

At stage 118, the method 110 includes sending, in response to receiving the indication, the particular data file from the first server to the second server before the particular data file would be sent, if at all, absent receiving the indication. For example, the server 40 may temporarily abandon, or at least overrule, the scheme being used to send the active data files to the server 22, find the particular data file, and send the particular data file to the server 22 ahead of schedule according to the scheme being implemented by the server 40. Thus, the server 40 may prioritize transfer of the particular data file to the server 22. For example, the particular data file may be moved to a front of a queue for being sent to the server 22. The server 40 may be configured to send the particular data file at a next possible (available) opportunity, e.g., by making the particular data file the next file to be transferred, e.g., after any scheduled data file transferring that cannot be changed is completed. The scheme being implemented by the server 40 for sending the active data files may be interrupted so that the server 40 may send the particular data file to the server 22, and the scheme resumed thereafter. All or less than all of the active data files may be scheduled (e.g., according to a determined order) to be transferred to the server 22. An order in which active data files are to be transferred may be changed to another, revised, order that includes the particular data file (if the original order did not include the particular data file, e.g., because the particular data file was an inactive data file), or that includes the particular data file in an earlier position in the revised order than in the original order. An earlier position in the revised order means that the particular data file will be sent to the server 22 in accordance with the revised order sooner than the particular data file would be sent to the server 22 in accordance with the original order. Instead of interrupting the scheme transferring active data, the particular data file may be transferred to the server 22 in parallel with the data transfer of the active data. The particular data file may be sent, for example, via a communication network such as a publicly-accessible communication network such as the Internet 16. The processor 92, possibly in combination with the memory 94, in combination with the transceiver 98 may comprise means for sending the particular data file.

Implementations of the method 110 may include one or more of the following features. In an example implementation, the method 110 may include, in response to receiving the request, sending multiple, e.g., a set of, VDFs from the first server to the second server. The processor 92, possibly in combination with the memory 94, in combination with the transceiver 98 may comprise means for sending VDFs. In another example implementation, the VDFs may be indicative of respective backed-up unstructured data files, e.g., may comprise pointers to respective data files of the backed-up unstructured data files for generating the indication. Thus, the VDF representing a particular data file may contain information to enable the VDF to appear like the particular data file, and information to be used in producing the indication of the particular data file. Selection of a VDF may result in generation of the indication for accessing the particular data file. The first server may determine the VDFs from the backed-up unstructured data files. The processor 92, possibly in combination with the memory 94, in combination with the transceiver 98 may comprise means for determining the VDFs. In another example implementation, the first server may send a file system architecture (e.g., a tiered structure of folders) to the second server to facilitate finding a VDF of a desired file to be retrieved. The indication of the particular data file may be received in response to selection of a particular VDF of the set of VDFs. The indication may be one of multiple indications, e.g., with multiple VDFs selected in response to selection of a folder corresponding to the multiple VDFs. The processor 92, possibly in combination with the memory 94, in combination with the transceiver 98 may comprise means for sending the particular data file. The means for sending can send the particular data file in response to the indication indicating selection of a particular VDF corresponding to the particular data file (with the same being true for multiple VDFs being selected). In another example implementation, a portion of the VDFs may correspond to active data files of the backed-up unstructured data files and another portion of the set of VDFs may correspond to inactive data files the backed-up unstructured data files. Alternatively, the set of VDFs may correspond only to active data files. In another example implementation, the method 110 may include interrupting sending the active data files to send the particular data file. The processor 92, possibly in combination with the memory 94, in combination with the transceiver 98 may comprise means for interrupting sending the active data files. In another example implementation, the means for sending the active data files may be configured to begin sending the active data files to the data-access server after the means for sending the VDFs send the VDFs. The VDFs may or may not be delivered before beginning to send active data files. Sending the VDFs before the active data files may expedite regaining operational status for the backed-up unstructured data. The VDFs may comprise a complete set of VDFs for the backed-up unstructured data files (representing all of the backed-up unstructured data file). Thus, sending of active data files may begin after sending a complete set of the VDFs. In another example implementation, sending the particular data file may comprise sending the particular data file at a next possible opportunity after receiving the indication. For example, the processor 92 may put the particular data file next in a queue to be sent, e.g., rearranging a present order of files to insert the particular file in the queue to be transferred next (e.g., after a file presently being transferred, or after the first file in the queue in front of which a file may be inserted for transfer). The processor 92, possibly in combination with the memory 94, in combination with the transceiver 98 may comprise means for sending the particular file at a next possible opportunity. In another example implementation, the method 110 may include scheduling the active data files to be sent in a first order, and sending the particular data file includes: changing the first order, if the first order lacks the particular data file, to a second order that includes the particular data file; or changing the first order, if the first order includes the particular data file, to a third order that includes the particular data file earlier than in the first order. For example, the active data files are scheduled, and an inactive data file may be inserted into the order, or an inactive data file may be moved up in the order. The processor 92, possibly in combination with the memory 94, may comprise means for scheduling the active data files to be sent in the first order, and means for changing the first order.

Figure 7:
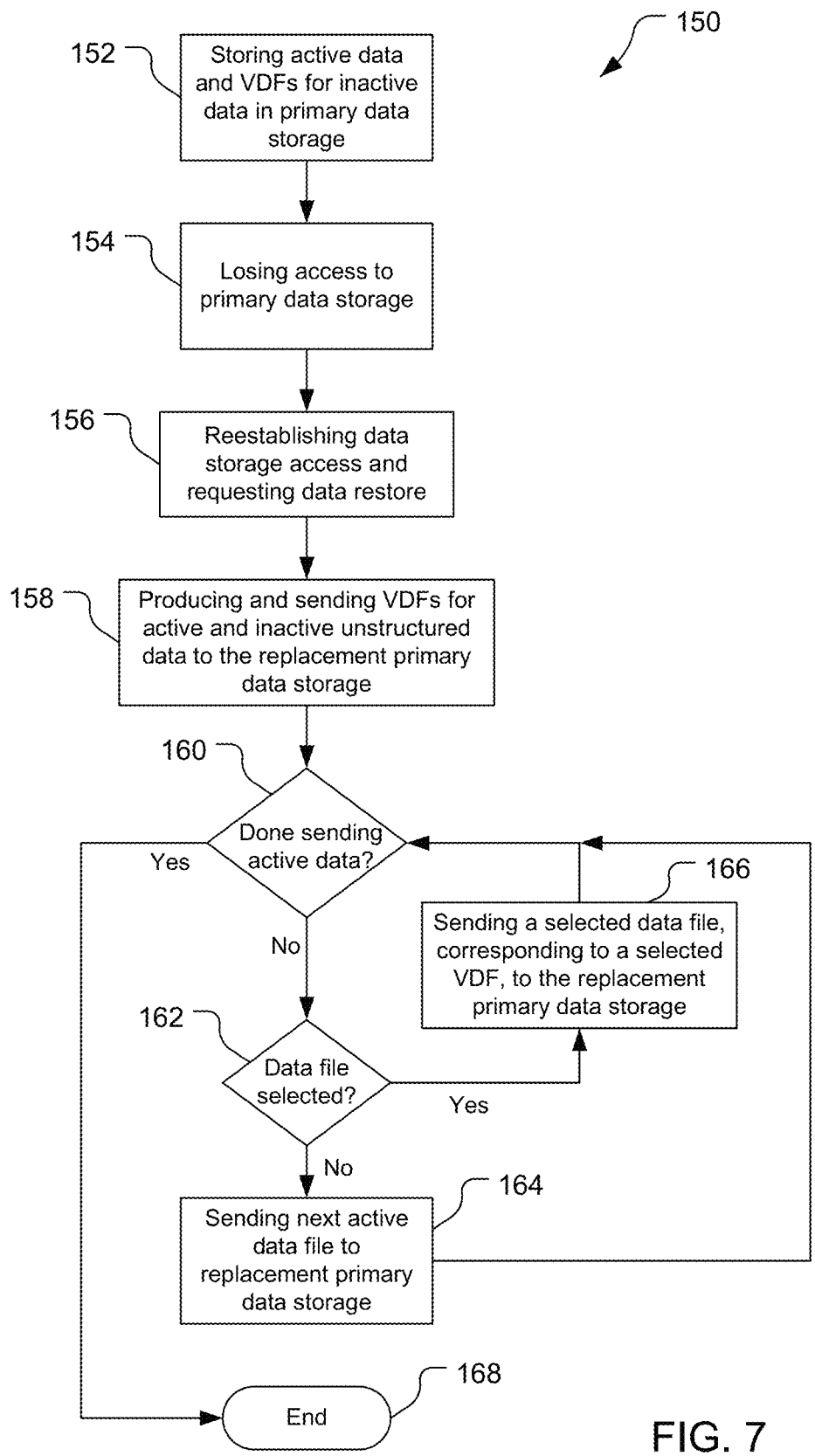
FIG. 7 is a block flow diagram of an example implementation of the data access recovery method shown in FIG. 6.
Figure 8:
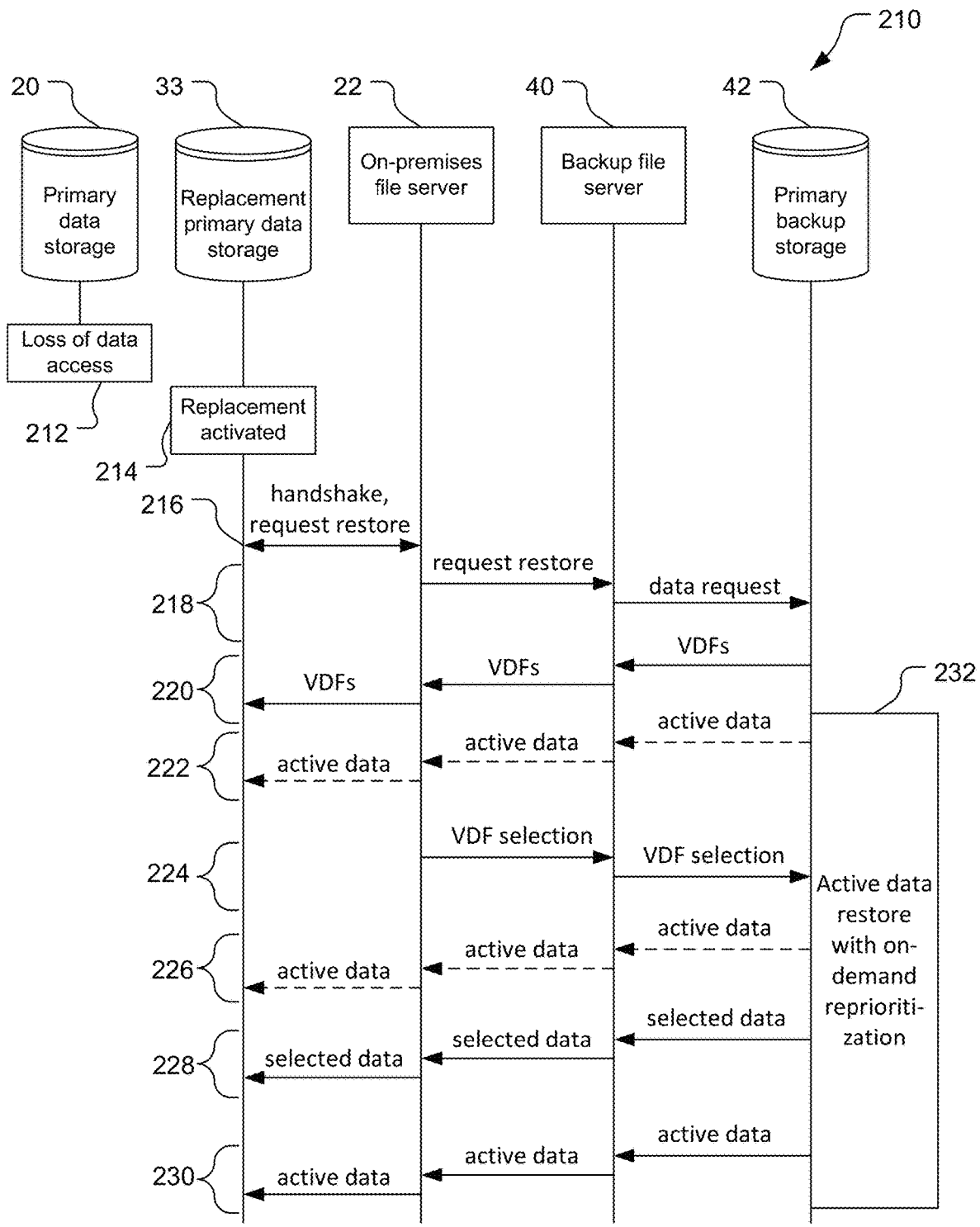
FIG. 8 is a diagram of communication and data flow in accordance with portions of the method shown in FIG. 7.
Figure 9:
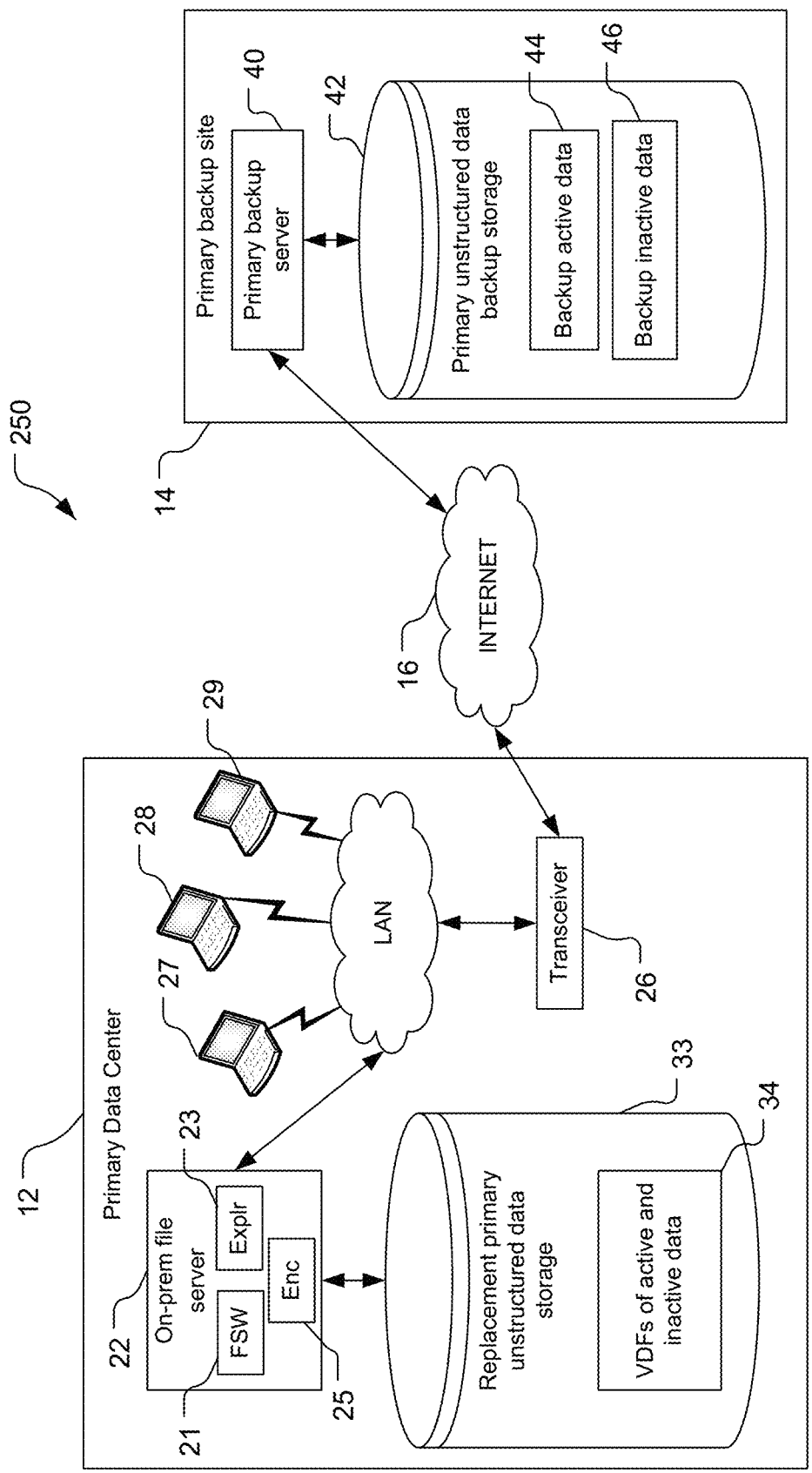
FIG. 9 is a simplified diagram of the data storage system shown in FIG. 2 near a beginning of a data restore process.

Referring to FIG. 7, with further reference to FIGS. 2-6 and FIGS. 8-11, a data access recovery method 150 includes the stages shown. The method 150 is, however, an example only and not limiting. The method 150 may be altered, e.g., by having stages added, removed, rearranged, combined, performed concurrently, and/or having single stages split into multiple stages. The method 150 is an example of an implementation of the method 110 shown in FIG. 6. Example portions of the method 150 are shown in a process and signal flow 210 shown in FIG. 8, and an example status of a data storage and retrieval system 250 is shown in FIG. 9. In FIG. 9, only one backup site is shown for simplicity.

At stage 152, the method 150 includes storing active data and VDFs for inactive data in primary data storage. For example, the primary unstructured data storage 20 stores active unstructured data 30 and VDFs of inactive unstructured data 32. The use of the VDFs for inactive data instead of storing the inactive data itself reduces the memory amount used, such that a smaller primary data storage can be used than would otherwise be needed, which can save capital expenditure cost for the storage.

At stage 154, the method 150 includes losing access to primary data storage. For example, some or all of the data stored in the primary unstructured data storage 20 may become inaccessible, e.g., due to damage to or destruction of all or part of the primary unstructured data storage 20, or due to ransomware prohibiting access, or due to failure of all or part of the primary data storage, or due to another cause. The loss of data access is also shown in stage 212 of the flow 210 shown in FIG. 8.

At stage 156, the method 150 includes reestablishing data storage access and requesting data restore. For example, if the primary unstructured data storage 20 was destroyed, then a replacement primary unstructured data storage 33 may be purchased and communicatively coupled to the on-premises file server 22. Storage for structured data is not shown and all data stored in the replacement primary unstructured data storage 33 are unstructured data. The replacement primary unstructured data storage 33 may be the original primary unstructured data storage 20, e.g., if the data were deleted from the storage 20, but the storage 20 is operational and access to the storage is available. The replacement primary unstructured data storage 33 may be activated as shown at stage 214 of the flow 210, and may handshake with the server 22 to enable communication between the replacement primary unstructured data storage 33 and the server 22 as shown at stage 216 of the flow 210. Further, the server 22 may send a request to restore unstructured data as shown at stage 218 of the flow 210. The request may be a request for: active data files and VDFs of inactive data files; or for data files for both active and inactive data; or for active data files, some inactive data files, and some VDFs for other inactive data files, or the request may be a generic restore request for unstructured data, or another form of request. At stage 218, the server 22 sends the request to the primary backup server 40, and the server 40 sends a corresponding data request to the primary unstructured data backup storage 42, e.g., to initiate data transfer from the primary unstructured data backup storage 42 to the replacement primary unstructured data storage 33.

At stage 158, the method 150 includes producing and sending VDFs for active and inactive unstructured data to the replacement primary data storage. As shown by stage 220 of the flow 210, the primary unstructured data backup storage 42 produces and provides the VDFs to the replacement primary unstructured data storage 33 via the primary backup server 40 and the file server 22. Alternatively, the VDFs may be produced by the primary backup server 40 by analyzing the unstructured data stored in the primary unstructured data backup storage 42. Each of the VDFs corresponds to a respective data file, active or inactive, in the backup data storage 42. Each of the VDFs points to the respective data file. Because the VDFs are small quantities of bits, the VDFs may be transferred to the replacement primary unstructured data storage 33 rapidly, much faster than the data that the VDFs represent (e.g., the data to which the VDFs point) and may be sent to the replacement primary unstructured data storage 33 in a matter of, for example, seconds or minutes instead of hours or days. For example, if each VDF comprises 4 kBytes of data, and an average data file is 400 kBytes, then 1 TByte of unstructured data will have approximately 10 GBytes of VDFs. If a transfer rate from the primary unstructured data backup storage 42 to the replacement primary unstructured data storage 33 is 50 Mbits/sec (which is affected by transfer rates between each of the entities in the chain from the storage 42 to the storage 33), then 10 GBytes of VDFs may be transferred to the storage 42 in about 27 minutes whereas the 1 TByte of data would take over 44 hours, nearly two days. At stage 158, e.g., before any data files (active or inactive) are sent, all of the VDFs may be sent to the replacement primary unstructured data storage. With the VDFs downloaded to the replacement primary unstructured data storage 33, the data storage and retrieval system 250 appears as shown in FIG. 9, with VDFs of active and inactive unstructured data 34 stored in the replacement primary unstructured data storage 33, in this case with no active or inactive data files stored in the storage 33 at this time. The time required to reach this state after the data restore request is made in stage 156 may be very short, due to the small size of the VDFs, especially relative to the time that would be required to transfer all the unstructured data, as explained above. However, as soon as all the VDFs are present in the replacement primary unstructured data storage, complete system operation and functionality have effectively been restored as all the unstructured data are represented in said the replacement primary storage and accessible via the VDFs. Even if fewer than all VDFs are transferred, system functionality may be restored that may be sufficient, e.g., if VDFs for desired unstructured data files are restored. With some or all VDFs are transferred before transferring data files, the time to restoration of operations may be reduced dramatically compared to restoring data files.

At stage 160, the method 150 includes determining whether all active data files have been transferred to the replacement primary unstructured data storage 33. For example, the server 40 may determine whether any further active files remain in the primary unstructured data backup storage 42 that have not been transferred to the replacement primary unstructured data storage 33. If all active data files have been transferred, then the method 150 proceeds to stage 168 where the method 150 ends, and the replacement primary unstructured data storage 33 will then look like the primary unstructured data storage 20 shown in FIG. 2, with active data files and VDFs of inactive data files. If any active data file has not yet been transferred, then the method 150 proceeds to stage 162. When a data file is stored in the replacement primary unstructured data storage 33, the VDF corresponding to that data file may be eliminated/deleted. Thus, the VDFs stored in the replacement primary unstructured data storage 33 may correspond to data files that have not been transferred to the data storage 33. It is possible that less than all active data files are to be transferred to the replacement primary unstructured data storage 33 (e.g., due to size and/or one or more other factors), and thus the inquiry at stage 160 may be whether all active data files that are to be transferred have been transferred.

At stage 162, the method 150 includes determining whether a data file has been selected. For example, the server 40 may determine whether a particular data file stored in the backup data storage 42 has been selected for prioritized transfer to the replacement primary unstructured data storage 33. For example, the server 40 may receive an indication of a particular data file stored in the data storage 42 to be transferred to the data storage 33. This may occur, for example, in response to a user of the computer 27 selecting a VDF using the user interface 88, with the computer 27 communicating with the server 22, and the server 22 sending the indication to the backup server 40 in response to the selection by the user. If a data file has been selected, then the method proceeds to stage 166, discussed below. This selection may be an indication that the user wants to access or work with the corresponding data file (e.g., the user may select an icon shown by the user interface 88 corresponding to the data file). If no data file has been selected, then the method 150 proceeds to stage 164.

At stage 164, the method 150 includes sending a next active data file to the replacement primary data storage. An initial transfer of active data is shown at stage 222 of the flow 210 shown in FIG. 9, as it is likely that at least some active data will be transferred before a VDF is selected. Dashed lines of the arrows shown in stage 222 indicated that active data may or may not be transferred before receipt of an indication of a VDF selection. Once sending of the active data file is at least initiated (e.g., the data file queued for transfer), the method 150 returns to stage 160. Consequently, multiple active data files may be transferred during stage 222 if no data file is selected in stage 162, as the method 150 will cycle through stages 160, 162, 164.

At stage 166, the method 150 includes sending a selected data file, corresponding to a selected VDF, to the replacement primary data storage. For example, the server 40 may receive the indication of the VDF selection as shown at stage 224 of the flow 210, and may respond to receiving the indication of the selected data file (which may be an active data file or an inactive data file) by accessing the selected data file in the backup data storage 42 and sending the selected data file to the replacement primary unstructured data storage 33 as shown at stage 228 of the flow 210. The server 40 may interrupt the order of transfer of the active data to send the selected data file. The server 40 may prioritize the sending of the selected data file (e.g., by moving the selected data file to the front of a queue of files to be sent, or as close to the front as the server 40 can put the selected data file). If the selected data file is an active data file, then the selected data file may be sent to the replacement primary unstructured data storage 33 before the selected data file would be sent absent the server 40 receiving the indication of the data file being selected. If the selected data file is an inactive data file, then the selected data file will be sent to the replacement primary unstructured data storage 33 when the selected data file may not otherwise be sent to the replacement primary data storage (e.g., if inactive data files are not to be sent, but only VDFs for inactive data files). The transfer of the selected data file is shown at stage 228 of the flow 210. As indicated by a stage 226 of the flow 210, one or more active data files may (or may not, as indicated by the dashed lines) be sent from the backup data storage 42 to the replacement primary unstructured data storage 33 after receipt of the indication of the data file selection (here the VDF selection) and before sending of the selected data file (e.g., due to time to put the selected data file in the queue for transfer to the replacement primary unstructured data storage 33). Further, as indicated by stage 230, after the selected data are sent at stage 228, further active data files may be sent to the replacement primary data storage (unless the selected data file was the last active data file). Multiple VDFs may be selected by a single user selection. For example, a user may select a folder of a file system architecture where the folder corresponds to data files represented by multiple VDFs. Selection of the folder may trigger the server 22 to select all the VDFs associated with the folder and send indications of selections of the VDFs to the server 40. The multiple data files may be transferred from the primary unstructured data backup storage 42 with higher priority, e.g., being transferred as a group out of order compared to an expected order of transfer.

The flow 210 may be used to restore all backed-up data or less than all of the backed-up data. For example, the active data restored may be less than all of the backed-up active data, with the non-restored backed-up active data being represented by corresponding VDFs. A restore request may explicitly or implicitly request a restore of less than all of the backup active data 44. For example, a restore request at stage 218 may indicate to restore the active data files only for the backup active data 44 that corresponds to data that have been accessed within a threshold amount of time that is different than the threshold amount of time for deeming data to be inactive. For example, active data may become inactive data after a year without access to the data, and the restore request at stage 218 may request to restore active data files only for the backup active data 44 that corresponds to data that have been accessed within the most recent six months, such that the backup active data 44 corresponding to data accessed between six months ago and a year ago will be restored as VDFs and not actual data files. The restore request at stage 218 may implicitly request a partial restore of active data files, e.g., according to a protocol, e.g., a "recent-file restore" request may correspond to restoring active data files only for active data that have been accessed within a predetermined amount of time, e.g., the previous six months. Numerous other implicit partial restore requests are possible. The restore request at stage 218 may explicitly request partial restore of inactive data files, e.g., indicating a full or partial restore of the backup active data and identifying (explicitly or implicitly) one or more files of the backup inactive data for restore.

As shown in FIG. 8, a stage 232 includes the stages 222, 224, 226, 228, 230. The stage 232 comprises active data restore with on-demand reprioritization. That is, the active data are transferred from the backup data storage 42 to the replacement primary unstructured data storage 33, e.g., in an on-going manner, with an order of transfer of the active data files changed/reprioritized in response to receipt of a data request (e.g., selection of a VDF or other indication of a data file) to either change the order of the active data files to send an active data file sooner than before the change (e.g., as soon as possible), or to send an inactive data file that otherwise would not be sent as part of the data restore.

Figure 10:
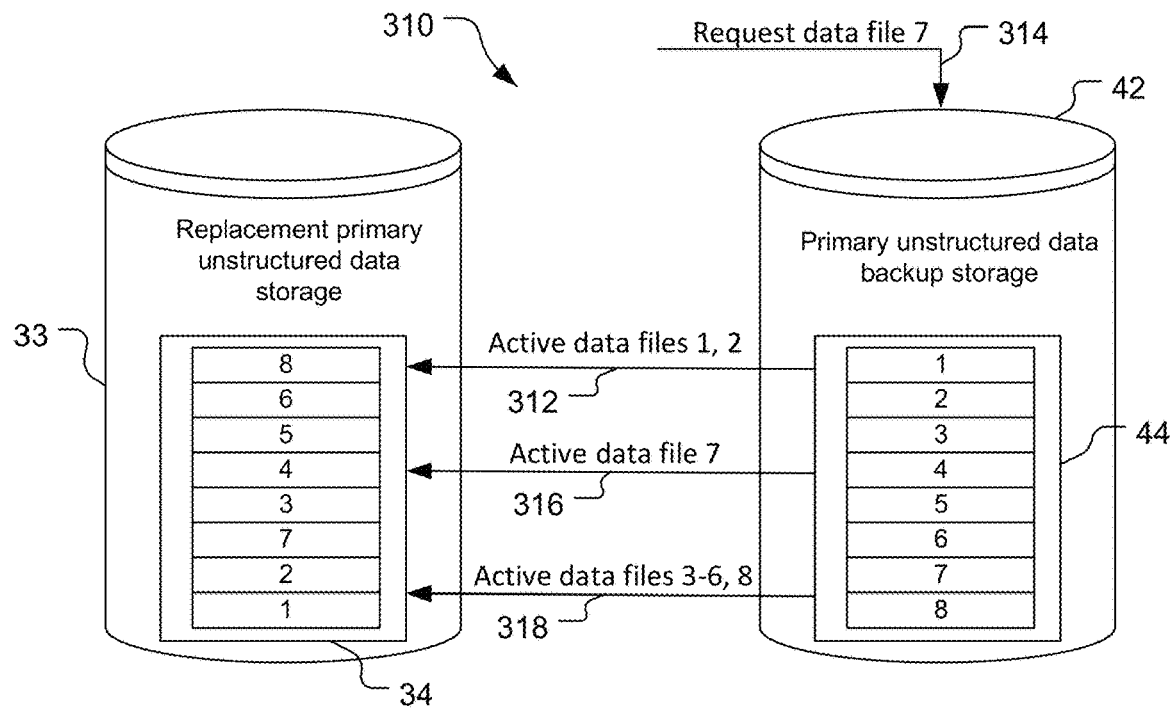
FIGS. 10 and 11 are simplified diagrams of data flow in accordance with portions of the method shown in FIG. 7.

Referring to FIG. 10, with further reference to FIGS. 2-9, an example data flow 310 between the replacement primary unstructured data storage 33 and the primary unstructured data backup storage 42 includes the stages shown. In this example, active data files 1-8 are stored in the primary unstructured data backup storage 42 such that the data files 1-8 will be sent to the replacement primary unstructured data storage 33 in numerical order absent selection of a VDF. At stage 312, active data files 1 and 2 are sent from the backup active data 44 to the replacement primary unstructured data storage 33. Stage 312 may correspond, for example, to stage 222 of the flow 210 where one or more active data files are sent before a VDF selection is received. At stage 314, a request for data file 7 is received by the primary unstructured data backup storage 42, e.g., from the server 22 in response to a VDF selection from the computer 27. Stage 314 may correspond to stage 224 of the flow 210. The selected data file, here the active data file 7, is reprioritized to alter the default order of transfer of the data files 1-8 to send the data file 7 earlier, here, as soon as possible. At stage 316, the active data file 7 is sent from the primary unstructured data backup storage 42 to the replacement primary unstructured data storage 33, in this example, before any other active data files are sent. Stage 316 may correspond to stage 228 of the flow 210. At stage 318, the remaining active data files 3-6 and 8 are sent to the replacement primary unstructured data storage 33 because no further VDF selections are received. Stage 318 may correspond to stage 230 of the flow 210. While all of the active data files 1-8 are shown as being transferred, less than all of the active data files 1-8 may be transferred, e.g., a data transfer scheme (e.g., schedule or order) may have less than all the active data files 1-8.

Figure 11:
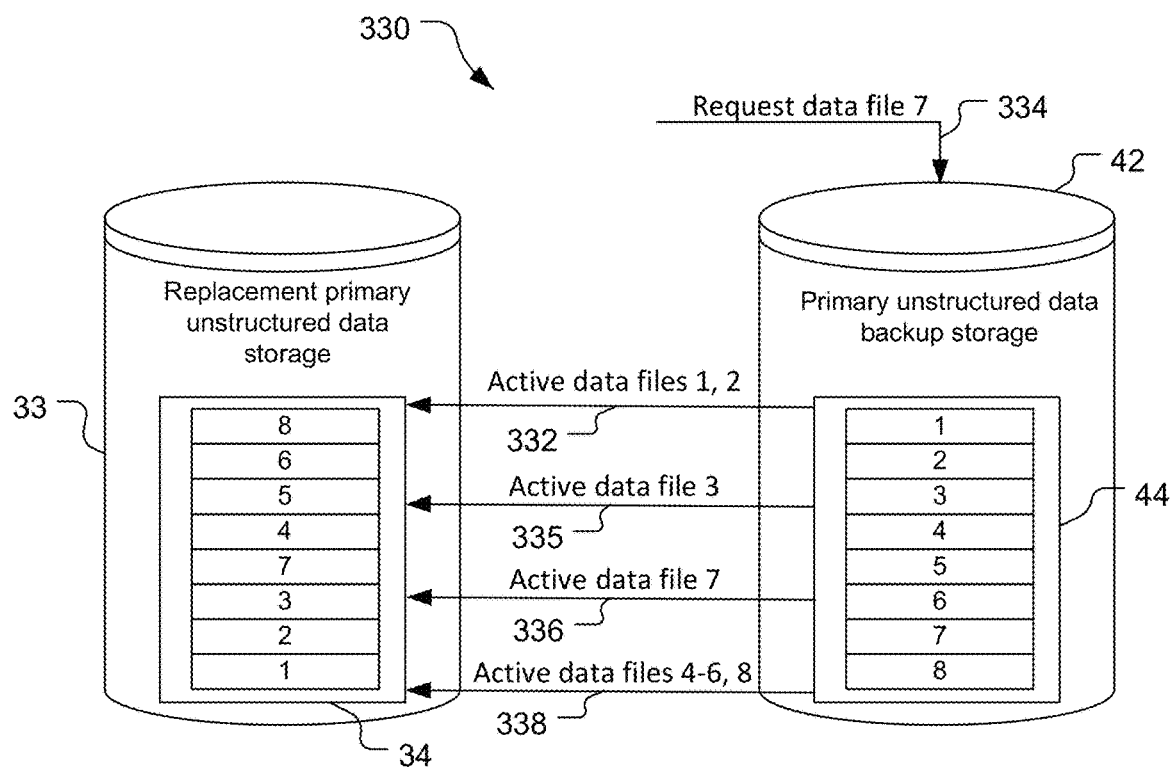

Referring to FIG. 11, with further reference to FIGS. 2-10, an example data flow 330 between the replacement primary unstructured data storage 33 and the primary unstructured data backup storage 42 includes the stages shown. The data flow 330 is similar to the data flow 310, except that in this example, the active data file 3 is sent to the replacement primary unstructured data storage 33 after receipt of a VDF selection and before transfer of the data file corresponding to the VDF selection. Thus, stages 332, 334, and 336 are similar to stages 312, 314, and 316, respectively. At stage 335, the data file 3 is sent after receiving the VDF selection of data file 7 at stage 334 but before sending the data file 7 at stage 336 (e.g., due to time to insert the data file 7 into the queue for transfer to the replacement primary unstructured data storage 33). At stage 338, active data files 4-6 and 8 are sent to the replacement primary unstructured data storage 33 as opposed to data files 3-6 and 8 that are sent at stage 318. Less than all the active data files 1-8 may be transferred.

The data flows 310, 330 show example data flows with a VDF selection corresponding to an active data file. Similar data flows would result from a VDF selection of an inactive data file. For example, if the selected VDF corresponded to a requested inactive data file at stage 314 or 334, then the requested inactive data file would be sent at stage 316 or 336, and at stages 318, 338, active data files 3-8 or 4-8, respectively, would be sent from the primary unstructured data backup storage 42 to the replacement primary unstructured data storage 33.

Figure 12:
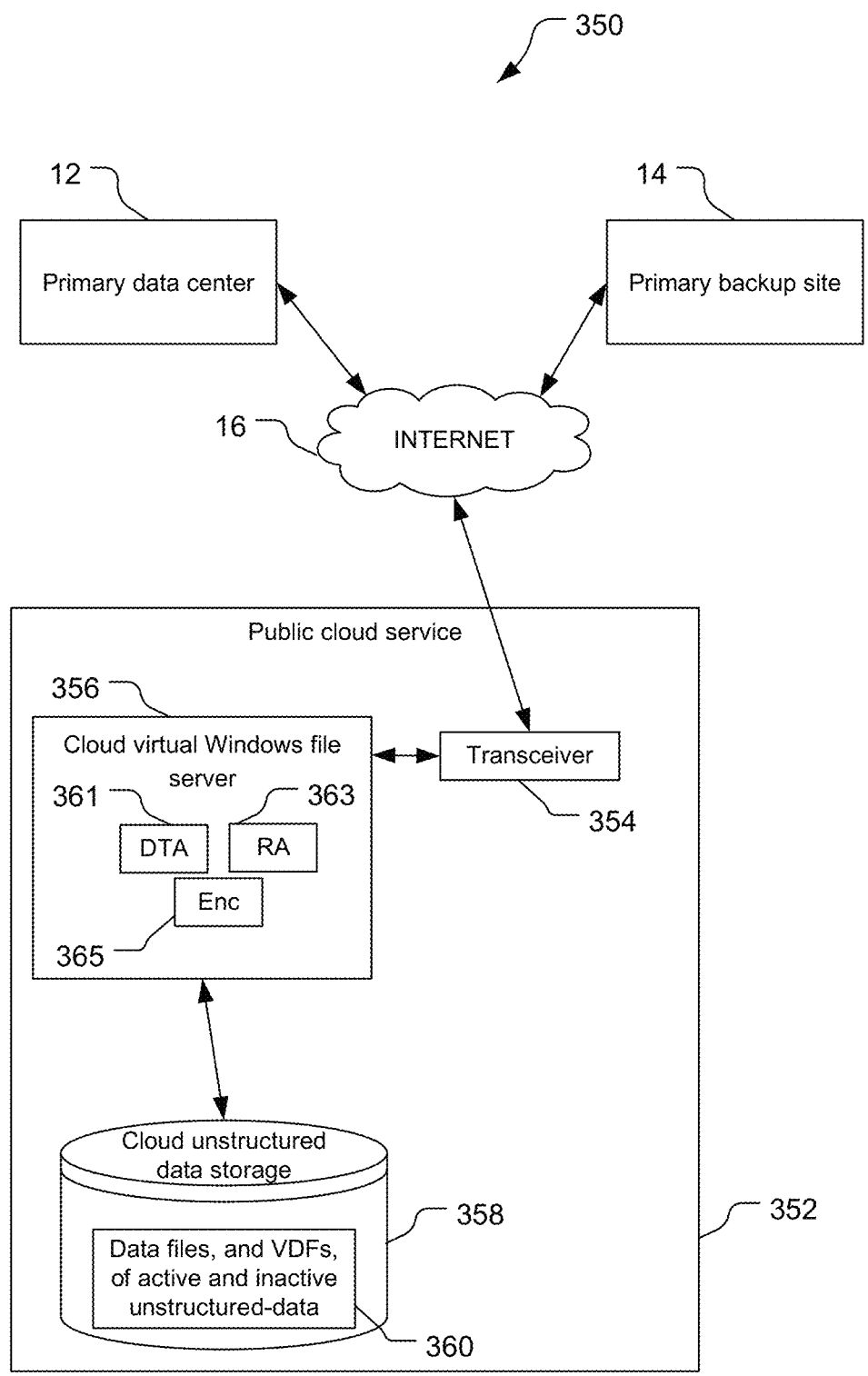
FIG. 12 is a simplified diagram of a hybrid cloud computing data storage and retrieval system.

Referring to FIG. 12, with further reference to FIG. 2, a hybrid cloud computing system 350 includes the primary data center 12, the primary backup site 14, the Internet, and a public cloud service 352. The primary backup site 14 may be the only backup site. The public cloud service 352 includes a transceiver 354, a cloud virtual Windows® file server 356, and cloud unstructured data storage 358. Storage for structured data is not shown and all VDFs stored in the cloud unstructured data storage 358 are VDFs of unstructured data. The server 356 may be configured similarly to the server 90, e.g., include similar components, and be configured to perform functions as discussed herein. The server 356 includes a DTA 361 configured similarly to the DTA 21, a retrieval agent 363 configured similarly to the retrieval agent 23, and an encryption subsystem 365 configured similarly to the encryption subsystem 25. The cloud unstructured data storage 358 may be any of a variety of types of storage, such as those discussed above with respect to the primary unstructured data storage 20. The cloud unstructured data storage 358 stores VDFs of active and inactive data 360, that is, VDFs corresponding to active data files and inactive data files, e.g., stored in the primary backup site 14. The VDFs may be accessed remotely, e.g., by a user of a computer of the primary data center 12, or a user of a computer located anywhere with access to the Internet 16. The VDFs may be selected, and the server 356 may respond to selection of a VDF by sending a request to the primary backup site 14 for the data file corresponding to the selected VDF. The primary backup site 14, e.g., the server 40, may respond to the received request by accessing and sending the corresponding data file to the public cloud service 352, e.g., to the server 356 which then stores the data file in the cloud unstructured data storage 358. Multiple VDFs may be selected, and thus multiple data files may be retrieved from the primary backup site 14 and stored in the cloud unstructured data storage 358. The user may access the retrieved data file(s) from the cloud unstructured data storage 358, e.g., to perform one or more tests on the data.

The system 350, and in particular the public cloud service 352, may be used as a development tool. For example, the server 356 may be altered according to a planned upgrade to the server 22 in the primary data center 12. Data files retrieved from the primary backup site 14 may be used to run quality assurance (QA) tests on the server 356 with the planned upgrade installed. Operation of the upgraded server, using the retrieved data, may be monitored to determine effectiveness and quality of the planned upgrade before installing the upgrade on the server 22. The operation may be checked using only the data needed for the tests instead of all active data of the primary data center 12.

The system 350 may be used for disaster recovery (DR) testing, e.g., to verify an ability to recover from a disaster involving the primary data center 12 by using the public cloud server 352. That is, it may be verified that the cloud may be used to recover from a disaster with the primary data center 12, e.g., to allow quick recovery if the data transfer rate from the primary backup site 14 to the public cloud service 352 is high, and with user access to the recovered data readily available by Internet access.

Figure 13:
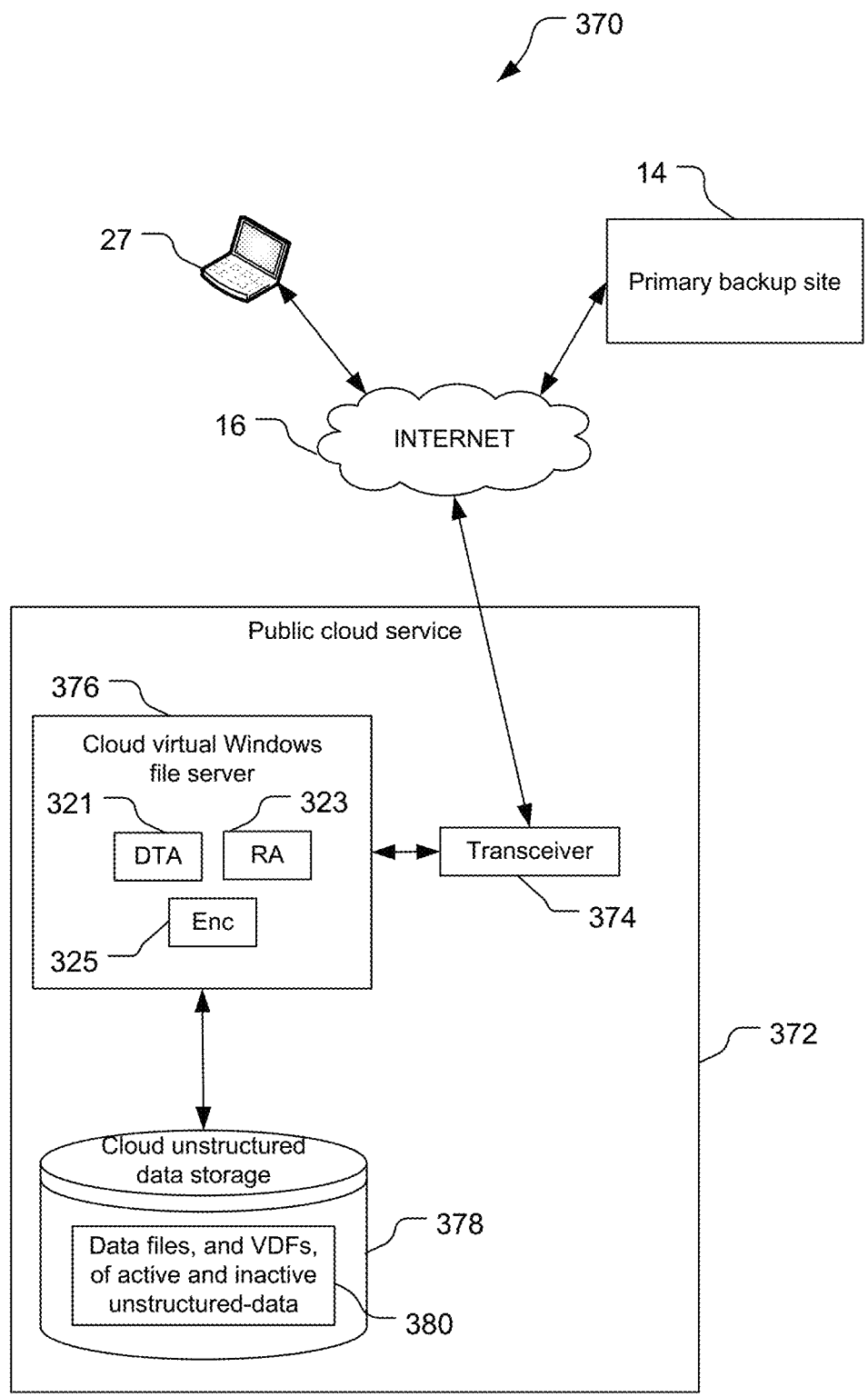
FIG. 13 is a simplified diagram of a cloud-based computing data storage and retrieval system.

Referring to FIG. 13, with further reference to FIG. 2, a cloud-based computing data storage and recovery system 370 includes the primary backup site 14, the Internet 16, the computer 27, and a public cloud service 372. The system 370 may be used, e.g., for cloud-based primary computing and cloud-based disaster recovery. The public cloud service 372 includes a transceiver 374, a cloud virtual Windows® file server 376, and a cloud unstructured data storage 378. The file server 376, as shown, may be configured similarly to the file server 22, including a data transport agent 321 configured similarly to the DTA 21, a retrieval agent 323 configured similarly to the retrieval agent 23, and an encryption agent 325 configured similarly to the encryption agent 25. The cloud unstructured data storage 378 stores VDFs of active and inactive data 380. Storage for structured data is not shown and all VDFs stored in the cloud unstructured data storage 378 are VDFs of unstructured data. The system 370 is similar to the system 10 shown in FIG. 2, except that the public cloud service 372 is used instead of the primary data center 12. The computer 27 can access the public cloud service 372 via the Internet 16 to perform desired operations, e.g., viewing data, editing data, adding data, retrieving data (e.g., for disaster recovery), etc. as the public cloud service 372 acts like a primary data center for the computer 27.

Figure 14:
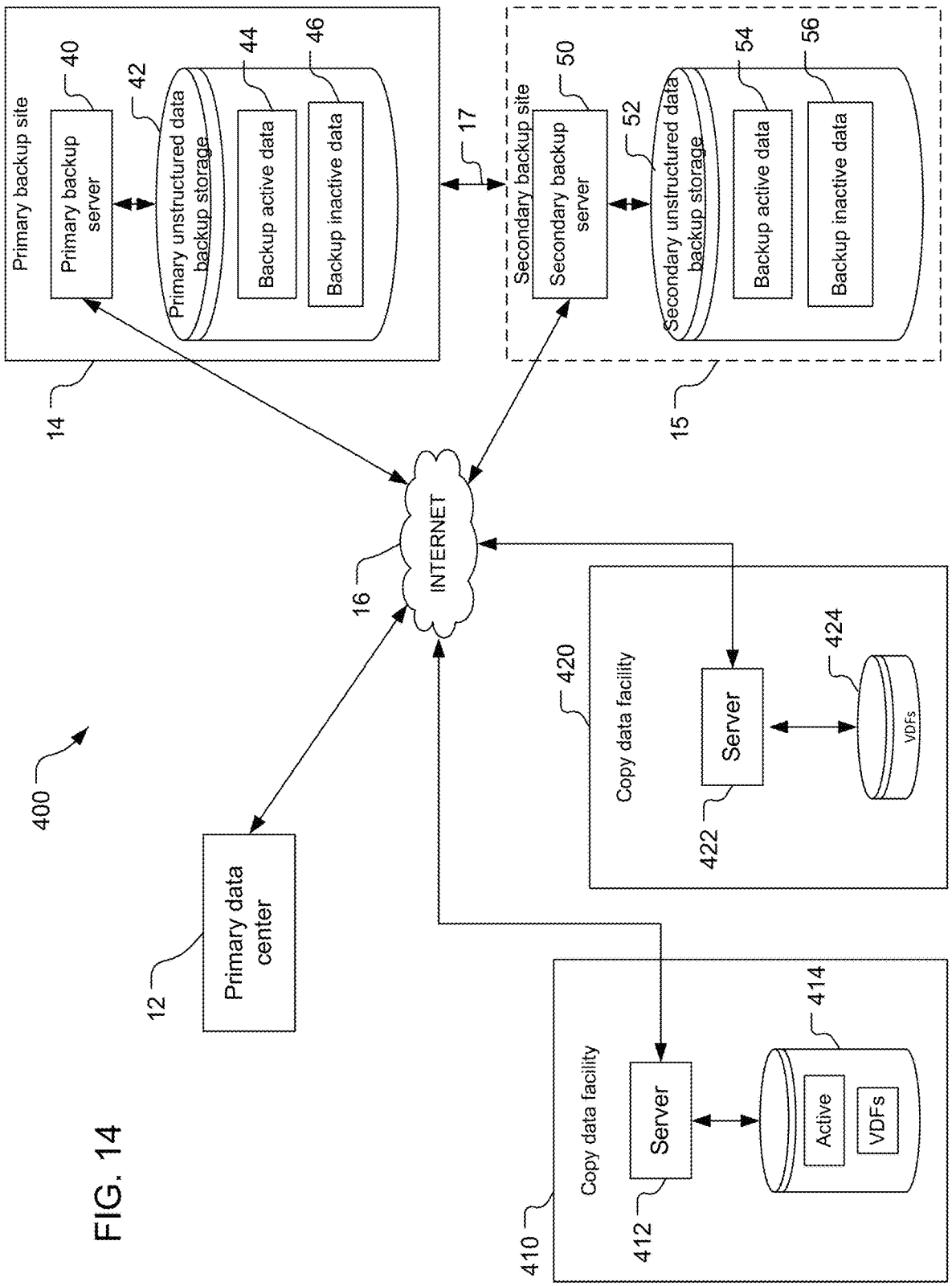
FIG. 14 is a simplified diagram of a data storage and retrieval system.

Referring to FIG. 14, with further reference to FIG. 2 and FIG. 5, a data storage and retrieval system 400 includes the primary data center 12, the primary backup site 14, the secondary backup site 15, the Internet 16, a copy data facility 410, and a copy data facility 420. A copy of some or all active and/or inactive data and/or VDFs for some or all data may be desired for various reasons. For example, a clone of active data and VDFs for inactive data may be desired for performance analysis, a set of VDFs for all active and inactive data may be desired for training purposes, or all active and inactive data files may be desired for development applications. The system 400 or a portion thereof (e.g., the server 40) may provide means for creating, e.g., using VDFs, an operational duplicate of an entirety or a portion of backed-up unstructured data files that may occupy significantly less storage space than the backed-up unstructured data files and use significantly less time to provide the operation copy than transferring all the backed-up unstructured data files. The primary backup site 14, e.g., the server 40, may be considered to be a data management system, e.g., for providing virtual copy data from the primary unstructured data backup storage 42. For example, the server 40 may be configured to respond to a copy data request for obtaining a copy of data from the primary unstructured data backup storage 42. The copy data request may request a copy of all data in the primary unstructured data backup storage 42. The primary backup server 40 may be configured to respond to the copy data request by providing VDFs of the data requested to be copied to the copy data facility 420 similar to the discussion of FIGS. 7 and 8 (e.g., in response to a data request at stage 218 shown in FIG. 8). The copy data VDFs may be transferred in much less time than for transferring the corresponding data files. The copy data VDFs may be stored in a copy data storage 424, although the copy data storage 424 may not be limited to storing copy data VDFs. The server 40 may determine the VDFs in response to the copy data request. The server 40 may provide a file system architecture along with the VDFs so that a user may navigate the architecture to find a desired VDF to select. A portion of the architecture, e.g., a folder, may also be selected, in which case all the VDFs within the selected folder are selected, thus triggering retrieval of the corresponding data files as discussed here, e.g., as discussed with respect to FIGS. 7 and 8. The VDFs occupy significantly less storage space than the corresponding active and inactive unstructured data. One or more of the VDFs may be selected to request the corresponding data from the primary unstructured data backup storage 42 and transfer the corresponding data from the primary unstructured data backup storage 42 to the copy data facility 420, similar to the data recovery discussion herein. In the data copy example, however, data files may not automatically be transferred to the copy data facility such that selection of one or more VDFs may not cause a change in a data transfer order.

The copy data facility 410 includes a server 412 and a copy data storage 414, and the copy data facility 420 includes a server 422 and a copy data storage 424. The servers 412, 414 may be configured with components similar to those of the server 90 with appropriate functionality. The servers 412, 422 are configured for bi-directional communication with the copy data storages 414, 424, respectively, and for bi-directional communication with the Internet 16. All or a portion of each of the copy data facility 410 and/or the copy data facility 420 may be physically disposed in, and part of, the primary data center 12. Each of the servers 412, 422 may be a portion (e.g., a partition) of the server 22 of the primary data center 12, or may independent of the server 22. Each of the servers 412, 422 may be a multi-cloud server that may be public or private.

As with data restore, all backed-up data or less than all of the backed-up data may be copied. Also or alternatively, all or less than all files of active data may be copied and/or some or all data files of inactive data may be copied as data files (instead of VDFs or to replace VDFs previously sent to the copy data facility 410 and/or the copy data facility 420). For example, the active data restored may be less than all of the backup active data 44, with the non-restored backup active data being represented by corresponding VDFs.

Some data files may be automatically transferred to a copy data facility in response to an explicit and/or implicit request for the data files in a copy data request. For example, the copy data request may explicitly or implicitly include one or more user indications of one or more data files to be transferred instead of, or in addition to, the VDF(s) corresponding to the data file(s). As another example, the server 40 may respond to a copy data request by automatically transferring (e.g., without user indication(s) of specific data file(s) to be transferred) either only VDFs for all or a portion of the data files, or one or more data files and VDFs for other data files based on a use (application) for the copy data request. The server 40 may be configured to determine the use of the copy data from the copy data request. For example, the server 40 may be configured to respond to a copy data request for data to be used for performance evaluation or quality assurance (QA) analysis by sending data files for the backup active data 44 (e.g., after sending VDFs for the backup active data 44) and VDFs only for the backup inactive data 46 (e.g., as shown in the copy data storage 414). As another example, the server 40 may be configured to respond to a copy data request for training purposes by sending only the VDFs for the backup active data 44 and the backup inactive data 46 (e.g., as shown in the copy data storage 424). To obtain a data file, the corresponding VDF stored in the copy data storage 424 could be selected. As another example, the server 40 may be configured to respond to a copy data request for software or system development purposes by sending all the data files of the backup active data 44 and the backup inactive data 46 (e.g., after initially sending the respective VDFs). The server 40 may be configured to respond to a copy data request including one or more explicit requests for data files by sending those data files (e.g., after sending corresponding VDFs) and sending VDFs for other data files. The server 40 may be configured to respond to a copy data request requesting (implicitly or explicitly) at least one data file by transferring the data file(s) to a copy data facility without transferring the VDF(s) for the data file(s) or to replace the VDF(s), corresponding to the data file(s), that has(have) been provided to the copy data facility.

In the example shown in FIG. 14, the copy data storage 414 stores active data files and VDFs and the copy data storage 424 stores VDFs only. The active data files and VDFs stored in the copy data storage 414 would occupy significantly more storage space than the VDFs stored in the copy data storage 424 if the VDFs in the copy data storage 424 correspond to the combination of the VDFs and the active data files stored in the copy data storage 414. The VDFs of both active and inactive data stored in the copy data storage 424 would typically occupy significantly less storage than the combination of active data files and VDFs of inactive data files stored in the copy data storage 414, which would occupy significantly less storage than storing all active and inactive data files. Thus, the storage space used corresponding to a copy data request may be based on, and may be reduced based on, the characteristics of the use of the copy data (e.g., software development, performance testing, QA, training).

Figure 15:
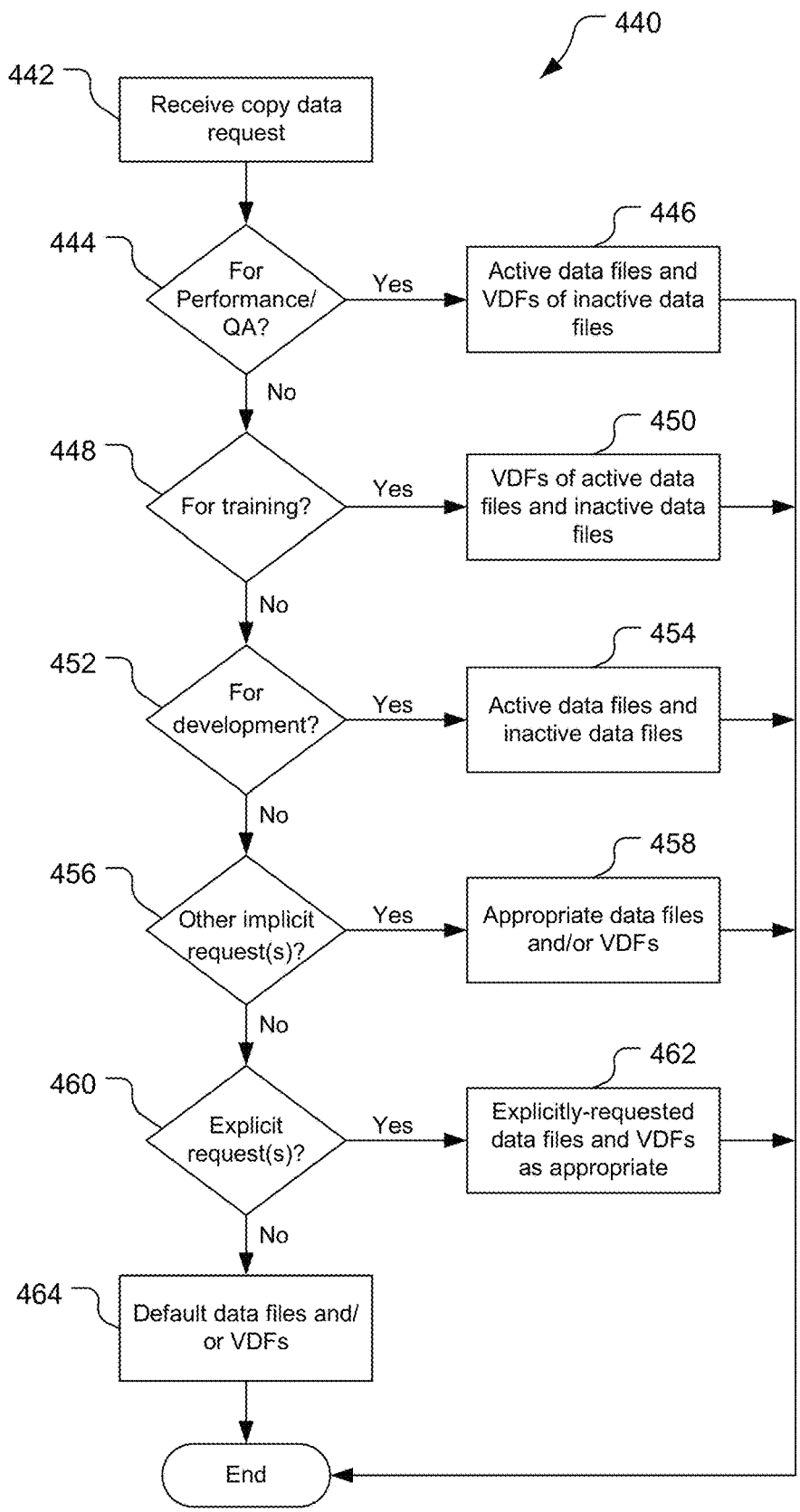
FIG. 15 is a simplified diagram of a method of responding to a copy data request.

Referring to FIG. 15, with further reference to FIGS. 2 and 14, a method 440 of responding to a copy data request includes the stages shown. The method 440 is, however, an example only and not limiting. The method 440 may be altered, e.g., by having stages added, removed, rearranged, combined, performed concurrently, and/or having single stages split into multiple stages.

At stage 442, a copy data request is received. For example, the server 40 may receive a copy data request from the primary data center 12, e.g., from one of the computers 27-29. The server 40 may analyze the copy data request to determine what data files and/or VDFs to send to a copy data facility.

At stage 444, an inquiry is made as to whether the copy data request is for data to be used performance analysis and/or QA. For example, the server 40 may determine whether the copy data request has an implicit and/or explicit request for data for use in performance analysis or QA. If the copy data request is for data for performance analysis and/or QA, then the method 440 proceeds to stage 446, where the server 40 sends the backup active data 44 and VDFs of the backup inactive data 46, and otherwise proceeds to stage 448. At stage 446, the server 40 may initially send VDFs of both the backup active data 44 and the inactive data 46, and then send the data files of the backup active data 44. This may expedite use of the copy data image as (all) the data files are present as VDFs and accessible via the VDFs, effectively providing access to data files before the data files are copied.

At stage 448, an inquiry is made as to whether the copy data request is for training purposes. For example, the server 40 may determine whether the copy data request has an implicit and/or explicit request for data for use in training. If the copy data request is for data for training purposes, then the method 440 proceeds to stage 450, where the server 40 sends VDFs of the backup active data 44 and VDFs of the backup inactive data 46, and otherwise proceeds to stage 452. Upon completion of stage 450, the copy data image may be immediately usable.

At stage 452, an inquiry is made as to whether the copy data request is for data to be used for development purposes, such as software programming or system alteration to add functionality or features to the program(s) or system(s) that access the data. For example, the server 40 may determine whether the copy data request has an implicit and/or explicit request for data for use in development. If the copy data request is for data for such development purposes, then the method 440 proceeds to stage 454, where the server 40 sends data files of the backup active data 44 and data files of the backup inactive data 46, and otherwise proceeds to stage 456. At stage 454, the server 40 may initially send VDFs of both the backup active data 44 and the backup inactive data 46, and only then send the data files of the backup active data 44 and the backup inactive data 46. This may expedite use of the copy data image as (all) the data files are present as VDFs and accessible via the VDFs, effectively providing access to data files before the data files are copied.

At stage 456, an inquiry is made as to whether the copy data request contains one or more implicit requests for data files one or more other purposes, here other than for performance analysis, QA, training, or development. For example, the server 40 may determine whether the copy data request has one or more implicit requests for one or more other purposes. If the copy data request has one or more implicit request for one or more other purposes, then the method 440 proceeds to stage 458, where the server 40 sends the appropriate data files and/or VDFs (e.g., according to the protocol(s) for the purpose(s) for the data), and otherwise proceeds to stage 460. At stage 458, the server 40 may initially send VDFs of any data files to be transferred, and then send the data files.

At stage 460, an inquiry is made as to whether the copy data request contains one or more explicit requests for data files. For example, the server 40 may determine whether the copy data request has one or more explicit requests for one or more data files (which may include one or more requests for one or more data files of the backup active data 44 and/or one or more request for one or more data files of the backup inactive data 46). If the copy data request has one or more explicit requests for one or more data files, then the method 440 proceeds to stage 458, where the server 40 sends the explicitly-requested data file(s) and VDFs for all other data files, if any, and otherwise proceeds to stage 464. At stage 462, the server 40 may initially send VDFs of any explicitly-requested data files to be transferred, and then send the data files.

At stage 464, the method 440 includes sending a default set of data files and/or VDFs to a copy data facility. The server 40 may be configured to respond to the copy data request not including any of the implicit requests that the server 40 is configured to check for, and not including any explicit request, to send a default configuration of data files and/or VDFs, e.g., only sending the VDFs, or sending the VDFs for the backed-up active data files and inactive data files, and then sending the backup active data 44 (i.e., the backed-up active data files). Other default configurations may be used.

Figure 16:
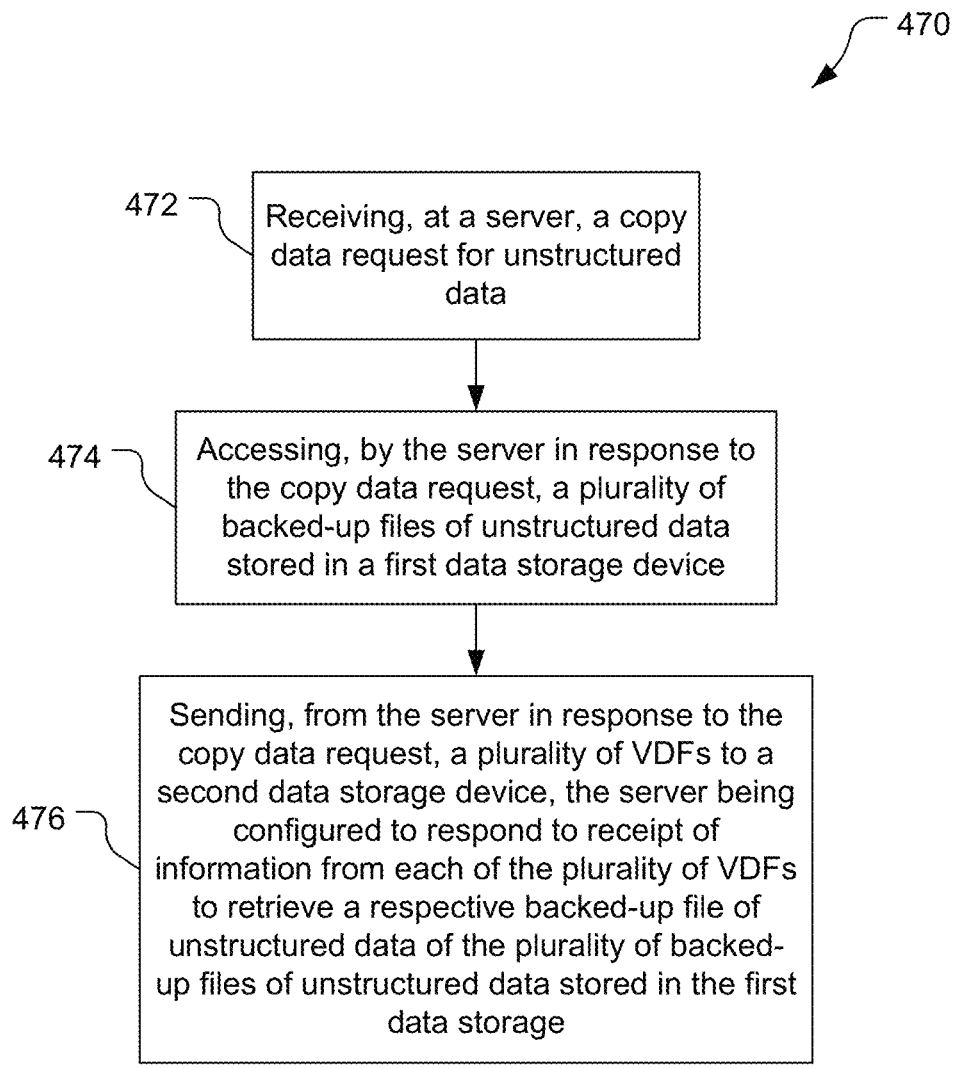
FIG. 16 is a simplified diagram of a data management method.

Referring to FIG. 16, with further reference to FIGS. 2-15, a data management method 470 includes the stages shown. The method 470 is, however, an example only and not limiting. The method 470 may be altered, e.g., by having stages added, removed, rearranged, combined, performed concurrently, and/or having single stages split into multiple stages.

At stage 472, the method 470 includes receiving, at a server, a copy data request for unstructured data. For example, a request for copy data is initiated by one of the computers 27-29 and sent to the server 40. The copy data request may indicate a destination, e.g., one or more of the copy data facilities 410, 420, for the copy data. The processor 92, possibly in combination with the memory 94, in combination with the transceiver 98 may comprise means for receiving a copy data request.

At stage 474, the method 470 includes accessing, by the server in response to the copy data request, a plurality of backed-up files of unstructured data stored in a first data storage device. For example, the processor 92 may access, via the transceiver 98, the primary unstructured data backup storage 42 in response to receiving the copy data request. The processor 92, possibly in combination with the memory 94, may comprise means for accessing the plurality of backed-up files of unstructured data stored in the first data storage (i.e., means for accessing the first data storage).

At stage 476, the method 470 includes sending, from the server in response to the copy data request, a plurality of VDFs to a second data storage device, the server being configured to respond to receipt of information from each of the plurality of VDFs to retrieve a respective backed-up file of unstructured data of the plurality of backed-up files of unstructured data stored in the first data storage. For example, the processor 92 may send, via the transceiver 98, VDFs corresponding to some or all of the backup active data 44 and/or some or all of the backup inactive data 46 in response to the copy data request. The processor 92, possibly in combination with the memory 94, in combination with the transceiver 98 may comprise means for sending the VDFs.

Implementations of such a method may include one or more of the following features. In an example implementation, each of the VDFs comprises a pointer to the respective backed-up file of unstructured data. In another example implementation, the method 470 may include determining the plurality of VDFs from the backed-up files of unstructured data. For example, the processor 92 can access the backed-up files of unstructured data and produce the VDFs in order to provide access to the respective data files by selecting the VDFs. Also or alternatively, the processor may determine the VDFs by obtaining the VDFs from the primary unstructured data backup storage 42 that determines the VDFs from the unstructured data files. The processor 92, possibly in combination with the memory 94, possibly in combination with the transceiver 98 may comprise means for determining the VDFs. In another example implementation, the method 470 may include sending at least one of the plurality of backed-up files of unstructured data to the second data storage device based on an implicit request in the copy data request, e.g., as discussed with respect to FIG. 15. For example, the memory 94 may store one or more protocols, for one or more corresponding implicit requests, that indicate whether and/or what backed-up files of unstructured data to provide based on receiving a corresponding implicit request. The processor 92, possibly in combination with the memory 94, in combination with the transceiver 98 may comprise means for sending the backed-up data file(s) based on an implicit request. In another example implementation, the implicit request may include an indication of a purpose for the copy data request, the purpose comprising at least one of performance analysis, quality assurance, development, or training. In another example implementation, the method 470 may include sending at least one of the plurality of backed-up files of unstructured data to the second data storage device based on an explicit request in the copy data request, e.g., as discussed with respect to FIG. 15. The processor 92, possibly in combination with the memory 94, in combination with the transceiver 98 may comprise means for sending the backed-up data file(s) based on an explicit request.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "processor-readable medium," "machine-readable medium," and "computer-readable medium," or the like as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

A statement that a value exceeds (or is more than or above) a threshold value (e.g., first threshold value) is equivalent to a statement that the value meets or exceeds another threshold value (e.g., a second threshold value) that is slightly greater than the first threshold value, e.g., the second threshold value being one value higher than the first threshold value in the resolution of a computing system. A statement that a value is less than (or is within or below) a threshold value (e.g., first threshold value) is equivalent to a statement that the value is less than or equal to another threshold value (e.g., a second threshold value) that is slightly lower than the first threshold value, e.g., the second threshold value being one value lower than the first threshold value in the resolution of a computing system.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

The invention claimed is:

1. A data management system comprising:
   accessing means for accessing a first data storage device storing a plurality of back-up files of unstructured data corresponding to original unstructured data files corresponding to a source data storage device;
   means for receiving a data replication request requesting replication of unstructured data; and
   means for sending, in response to the data replication request, a plurality of Virtual Data Files (VDFs) to a second data storage device that is separate from the first data storage device and that is separate from the source data storage device, the plurality of VDFs including information based on which the accessing means can access respective portions of the plurality of back-up files of unstructured data stored in the first data storage device.

2. The data management system of claim 1, further comprising means for sending a particular back-up file of unstructured data, of the plurality of back-up files of unstructured data, from the first data storage device to the second data storage device in response to receiving an indication of a selection of a particular VDF, of the plurality of VDFs, corresponding to the particular back-up file of unstructured data.

3. The data management system of claim 1, wherein each VDF of the plurality of VDFs comprises a pointer to a respective back-up file of unstructured data of the plurality of back-up files of unstructured data.

4. The data management system of claim 1, further comprising means for determining the plurality of VDFs from the plurality of back-up files of unstructured data.

5. The data management system of claim 1, wherein a first portion of the plurality of VDFs correspond to active data files and a second portion of the plurality of VDFs correspond to inactive data files.

6. The data management system of claim 1, further comprising means for automatically sending at least one of the plurality of back-up files of unstructured data to the second data storage device based on an implicit request for data files in the data replication request.

7. The data management system of claim 1, wherein the data replication request comprises an indication of a purpose for the data replication request, the purpose comprising at least one of performance analysis, quality assurance, development, disaster recovery testing, or training.

8. A data management system comprising:
   a transceiver;
   a memory; and
   a processor communicatively coupled to the transceiver and the memory and configured to:
   receive, via the transceiver, a copy data request for replication of unstructured data;
   access, in response to the copy data request, a plurality of back-up files of unstructured data stored in a first data storage device, the plurality of back-up files of unstructured data corresponding to original unstructured data files corresponding to a source data storage device;
   send, in response to the copy data request, a plurality of Virtual Data Files (VDFs) to a second data storage device that is separate from the first data storage device and that is separate from the source data storage device, the processor being configured to respond to receipt of information corresponding to a first portion of the plurality of VDFs to retrieve a second portion of the plurality of back-up files of unstructured data stored in the first data storage device.

9. The data management system of claim 8, wherein each VDF of the plurality of VDFs comprises a pointer to a respective back-up file of unstructured data of the plurality of back-up files of unstructured data.

10. The data management system of claim 8, wherein the processor is configured to determine the plurality of VDFs from the plurality of back-up files of unstructured data.

11. The data management system of claim 8, wherein the processor is configured to send at least one of the plurality of back-up files of unstructured data to the second data storage device based on an implicit request in the copy data request.

12. The data management system of claim 11, wherein the implicit request comprises an indication of a purpose for the copy data request, the purpose comprising at least one of performance analysis, quality assurance, development, disaster recovery testing, or training.

13. The data management system of claim 8, wherein the processor is configured to send at least one of the plurality of back-up files of unstructured data to the second data storage device based on an explicit request in the copy data request.

14. A non-transitory, processor-readable storage medium comprising processor-readable instructions to cause a processor of a data management system to:
    access, in response to receiving a data replication request requesting replication of unstructured data, a first data storage device storing a plurality of back-up files of unstructured data corresponding to original unstructured data files corresponding to a source data storage device; and
    send, in response to the data replication request, a plurality of Virtual Data Files (VDFs) to a second data storage device that is separate from the first data storage device and that is separate from the source data storage device, the plurality of VDFs including information based on which the processor can access respective portions of the plurality of back-up files of unstructured data stored in the first data storage device.

15. The non-transitory, processor-readable storage medium of claim 14, further comprising processor-readable instructions configured to cause the processor to send a particular back-up file of unstructured data, of the plurality of back-up files of unstructured data, to the second data storage device in response to receiving an indication of a selection of a particular VDF, of the plurality of VDFs, corresponding to the particular back-up file of unstructured data.

16. The non-transitory, processor-readable storage medium of claim 14, wherein each VDF of the plurality of VDFs comprises a pointer to a respective back-up file of unstructured data of the plurality of back-up files of unstructured data.

17. The non-transitory, processor-readable storage medium of claim 14, further comprising processor-readable instructions to cause the processor to determine the plurality of VDFs from the plurality of back-up files of unstructured data.

18. The non-transitory, processor-readable storage medium of claim 14, wherein a first portion of the plurality of VDFs correspond to active data files and a second portion of the plurality of VDFs correspond to inactive data files.

19. The non-transitory, processor-readable storage medium of claim 14, further comprising processor-readable instructions to cause the processor to automatically send at least one of the plurality of back-up files of unstructured data to the second data storage device based on an implicit request for data files in the data replication request.

20. The non-transitory, processor-readable storage medium of claim 19, wherein the implicit request for data files comprises an indication of a purpose for the data replication request, the purpose comprising at least one of performance analysis, quality assurance, development, disaster recovery testing, or training.

* * * * *